United States Patent
Lee et al.

(10) Patent No.: US 12,500,713 B2
(45) Date of Patent: Dec. 16, 2025

(54) METHOD AND APPARATUS FOR TRANSMITTING SL PRS IN NR V2X

(71) Applicant: LG ELECTRONICS INC., Seoul (KR)

(72) Inventors: Seungmin Lee, Seoul (KR); Hanbyul Seo, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 401 days.

(21) Appl. No.: 17/635,356

(22) PCT Filed: Aug. 18, 2020

(86) PCT No.: PCT/KR2020/010969
§ 371 (c)(1),
(2) Date: Feb. 14, 2022

(87) PCT Pub. No.: WO2021/034076
PCT Pub. Date: Feb. 25, 2021

(65) Prior Publication Data
US 2022/0278797 A1    Sep. 1, 2022

Related U.S. Application Data

(60) Provisional application No. 62/901,762, filed on Sep. 17, 2019, provisional application No. 62/895,982, (Continued)

(51) Int. Cl.
*H04L 5/00* (2006.01)
*H04W 72/20* (2023.01)
*H04W 4/40* (2018.01)

(52) U.S. Cl.
CPC .......... *H04L 5/0048* (2013.01); *H04L 5/0055* (2013.01); *H04W 72/20* (2023.01); *H04W 4/40* (2018.02)

(58) Field of Classification Search
CPC ... H04L 5/0048; H04L 5/0055; H04L 1/1854; H04L 5/0053; H04W 72/20; H04W 4/40;
(Continued)

(56) References Cited

U.S. PATENT DOCUMENTS

2015/0208262 A1\* 7/2015 Siomina ................ H04W 24/10
370/252
2020/0305174 A1\* 9/2020 Ganesan ............... H04W 72/12
(Continued)

FOREIGN PATENT DOCUMENTS

| CN | 108289021 A | \* | 7/2018 | .......... H04L 5/0051 |
| KR | 20200127680 A | \* | 11/2020 | .......... H04L 1/1812 |
| WO | 2019/151915 A1 | | 8/2019 | |

OTHER PUBLICATIONS

LG Electronics, "Discussion on resource allocation for NR sidelink Mode 1", R1-1907013, 3GPP TSG RAN WG1 #97 Meeting, Reno, May 13-17, 2019, see section 2.
(Continued)

*Primary Examiner* — Atique Ahmed
(74) *Attorney, Agent, or Firm* — BRYAN CAVE LEIGHTON PAISNER LLP

(57) ABSTRACT

According to an embodiment of the present disclosure, a method in which a first apparatus performs sidelink communication is provided. The method may comprise: receiving a PSCCH from a second apparatus; receiving a PSSCH related to the PSCCH from the second apparatus; transmitting an SL PRS for sidelink positioning to the second apparatus; determining a PSFCH resource for transmitting a PSFCH to the second apparatus based on the PSCCH and the PSSCH; and transmitting the PSFCH to the second apparatus based on the PSFCH resource, wherein a time interval in which the SL PRS is transmitted and a time interval in which the PSFCH is transmitted may overlap each other.

10 Claims, 27 Drawing Sheets

Related U.S. Application Data filed on Sep. 4, 2019, provisional application No. 62/892,010, filed on Aug. 27, 2019, provisional application No. 62/888,385, filed on Aug. 16, 2019.

(58) Field of Classification Search
CPC ... H04W 72/569; H04W 76/14; H04W 64/00; H04W 92/18
See application file for complete search history.

(56) References Cited

U.S. PATENT DOCUMENTS

| | | | |
|---|---|---|---|
| 2021/0028891 A1* | 1/2021 | Zhou | H04W 4/40 |
| 2021/0219268 A1* | 7/2021 | Li | H04B 17/318 |
| 2022/0038217 A1* | 2/2022 | Yoshioka | H04L 1/1819 |
| 2022/0132460 A1* | 4/2022 | Shimoda | H04W 64/003 |
| 2022/0232329 A1* | 7/2022 | Shriner | H04R 25/02 |
| 2022/0232529 A1* | 7/2022 | Lin | H04L 1/1861 |
| 2023/0048608 A1* | 2/2023 | Ren | H04L 5/0051 |
| 2023/0199802 A1* | 6/2023 | Ganesan | H04W 72/25 370/329 |

OTHER PUBLICATIONS

CATT, "Sidelink physical layer procedures in NR V2X", R1-1906319, 3GPP TSG RAN WG1 Meeting #97, Reno, USA, May 13-17, 2019, see section 2.

TCL Communication, "Physical Layer Procedures for Sidelink", R1-1908279, 3GPP TSG RAN WG1 Meeting #98, Prague, Czech Republic, Aug. 26-30, 2019, see sections 2-3.

Intel Corporation, "Sidelink Physical Structure for NR V2X Communication", R1-1907906, 3GPP TSG RAN WG1 Meeting #97, Reno, USA, May 13-17, 2019, see sections 2-3.

\* cited by examiner

FIG. 13 receiving first SCI and/of second SCI from a first apparatus — S1310

METHOD AND APPARATUS FOR TRANSMITTING SL PRS IN NR V2X

This application is the National Stage filing under 35 U.S.C. 371 of International Application No. PCT/KR2020/010969, filed on Aug. 18, 2020, which claims the benefit of and priority to U.S. Provisional Application No. 62/888,385, filed on Aug. 16, 2019, U.S. Provisional Application No. 62/892,010, filed on Aug. 27, 2019, U.S. Provisional Application No. 62/895,982, filed on Sep. 4, 2019 and U.S. Provisional Application No. 62/901,762, filed on Sep. 17, 2019, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

An object of the present disclosure is to provide a sidelink (SL) communication method between devices (or UEs) and an apparatus (or UE) for performing the same.

Another technical object of the present disclosure is to provide a method for transmitting a Sidelink Positioning Reference Signal (SL PRS) and a Physical Sidelink Feedback Channel (PSFCH) in NR V2X and an apparatus (or UE) for performing the same.

Technical Solutions

According to an embodiment of the present disclosure, a method for performing, by a first apparatus, sidelink communication may be proposed. The method may comprise: receiving, from a second apparatus, a physical sidelink control channel (PSCCH); receiving, from the second apparatus, a physical sidelink shared channel (PSSCH) related to the PSCCH; transmitting, to the second apparatus, a sidelink positioning reference signal (SL PRS) for sidelink positioning; determining, based on the PSCCH and the PSSCH, a physical sidelink feedback channel (PSFCH) resource for transmitting a PSFCH to the second apparatus; and transmitting, to the second apparatus, the PSFCH based on the PSFCH resource, wherein a time interval in which the SL PRS is transmitted and a time interval in which the PSFCH is transmitted overlap each other.

According to an embodiment of the present disclosure, a first apparatus for performing sidelink communication may be provided. The first apparatus may comprise: one or more memories storing instructions, one or more transceivers and one or more processors connected to the one or more memories and the one or more transceivers. For example, the one or more processors may execute the instructions to: receive, from a second apparatus, a physical sidelink control channel (PSCCH); receive, from the second apparatus, a physical sidelink shared channel (PSSCH) related to the PSCCH; transmit, to the second apparatus, a sidelink positioning reference signal (SL PRS) for sidelink positioning; determine, based on the PSCCH and the PSSCH, a physical sidelink feedback channel (PSFCH) resource for transmitting a PSFCH to the second apparatus; and transmit, to the second apparatus, the PSFCH based on the PSFCH resource, wherein a time interval in which the SL PRS is transmitted and a time interval in which the PSFCH is transmitted overlap each other.

According to an embodiment of the present disclosure, an apparatus (or a chip(set)) configured to control a first user equipment (UE), the apparatus may comprise: one or more processors; and one or more memories operably connected to the one or more processors and storing instructions. For example, the one or more processors may execute the instructions to: receive, from a second UE, a physical sidelink control channel (PSCCH); receive, from the second UE, a physical sidelink shared channel (PSSCH) related to the PSCCH; transmit, to the second UE, a sidelink positioning reference signal (SL PRS) for sidelink positioning; determine, based on the PSCCH and the PSSCH, a physical sidelink feedback channel (PSFCH) resource for transmitting a PSFCH to the second UE; and transmit, to the second UE, the PSFCH based on the PSFCH resource, wherein a time interval in which the SL PRS is transmitted and a time interval in which the PSFCH is transmitted overlap each other.

According to an embodiment of the present disclosure, a non-transitory computer-readable storage medium storing instructions may be proposed. For example, the instructions, when executed, may cause a first apparatus to: receive, from a second apparatus, a physical sidelink control channel (PSCCH); receive, from the second apparatus, a physical sidelink shared channel (PSSCH) related to the PSCCH; transmit, to the second apparatus, a sidelink positioning reference signal (SL PRS) for sidelink positioning; determine, based on the PSCCH and the PSSCH, a physical sidelink feedback channel (PSFCH) resource for transmitting a PSFCH to the second apparatus; and transmit, to the second apparatus, the PSFCH based on the PSFCH resource, wherein a time interval in which the SL PRS is transmitted and a time interval in which the PSFCH is transmitted overlap each other.

According to an embodiment of the present disclosure, a method for performing wireless communication by a second apparatus may be proposed. The method may comprise: transmitting, to a first apparatus, a physical sidelink control channel (PSCCH); transmitting, to the first apparatus, a physical sidelink shared channel (PSSCH) related to the PSCCH; receiving, from the first apparatus, a sidelink positioning reference signal (SL PRS) for sidelink positioning; and receiving, from the first apparatus, the PSFCH based on the PSCCH and the PSSCH, wherein a time interval in which the SL PRS is transmitted and a time interval in which the PSFCH is transmitted overlap each other.

According to an embodiment of the present disclosure, a second apparatus configured to perform wireless communication may be proposed. For example, the second apparatus may comprise: one or more memories storing instructions; one or more transceivers; and one or more processors connected to the one or more memories and the one or more transceivers. For example, the one or more processors may execute the instructions to: transmit, to a first apparatus, a physical sidelink control channel (PSCCH); transmit, to the first apparatus, a physical sidelink shared channel (PSSCH) related to the PSCCH; receive, from the first apparatus, a sidelink positioning reference signal (SL PRS) for sidelink positioning; and receive, from the first apparatus, the PSFCH based on the PSCCH and the PSSCH, wherein a time interval in which the SL PRS is transmitted and a time interval in which the PSFCH is transmitted overlap each other.

Effects of the Disclosure

According to the present disclosure, sidelink communication between devices (or UEs) can be efficiently performed.

BRIEF DESCRIPTION OF THE DRAWINGS

FIG. 13 shows a method for a second device to receive an SCI, according to an embodiment of the present disclosure.

DESCRIPTION OF EXEMPLARY EMBODIMENTS

Figure 1:
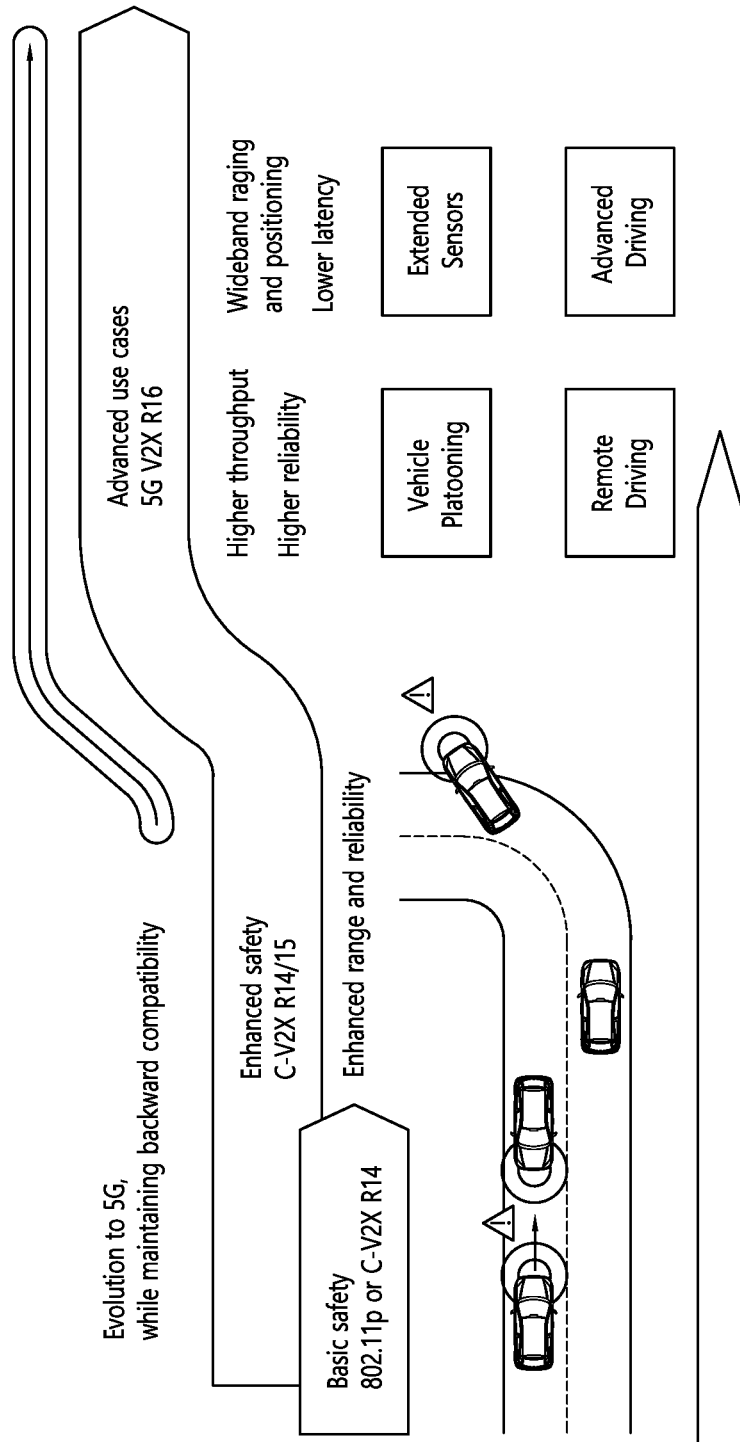
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency bands (millimeter waves) of 24 GHz or more, and so on.

For clarity in the description, the following description will mostly focus on LTE-A or 5G NR. However, technical features according to an embodiment of the present disclosure will not be limited only to this.

Figure 2:
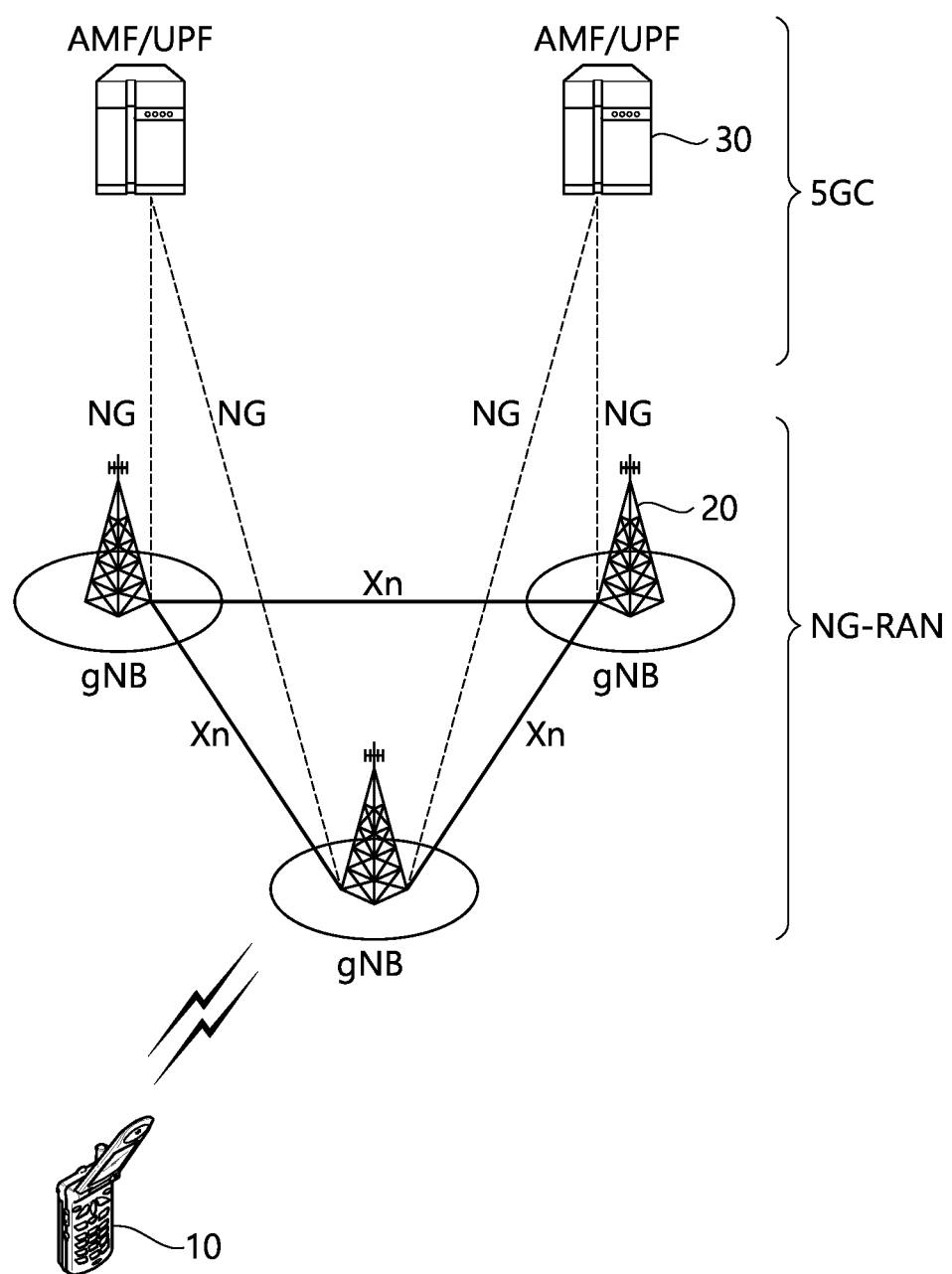
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
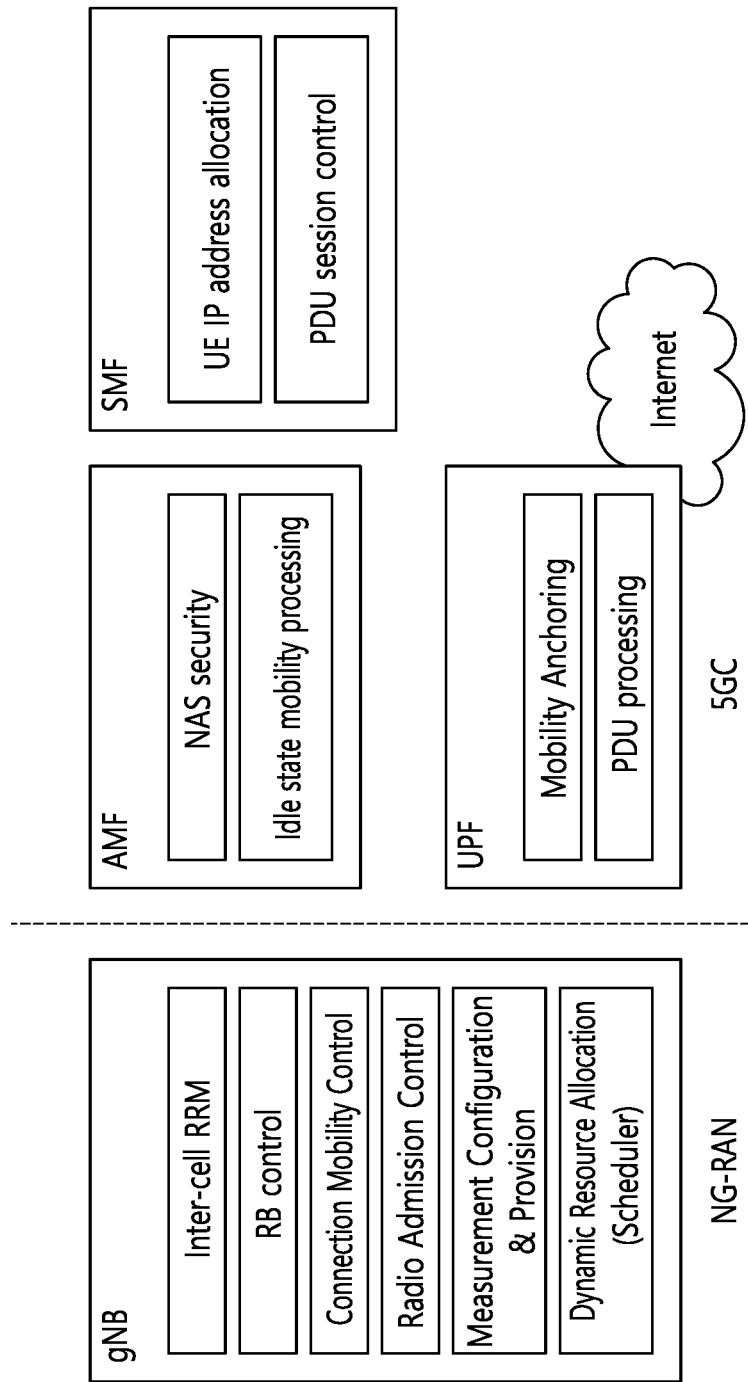
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4A:
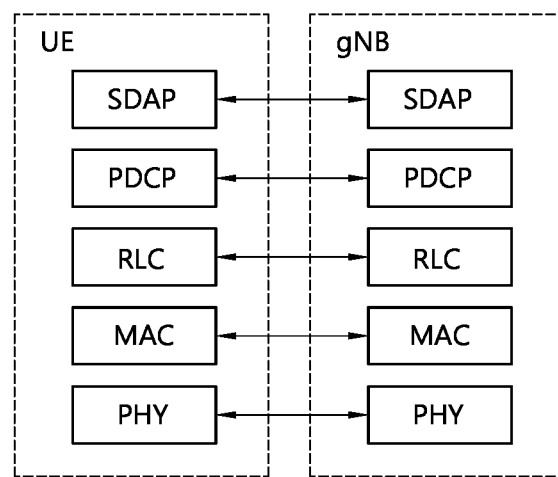
FIGS. 4A and 4B show a radio protocol architecture, based on an embodiment of the present disclosure.
Figure 4B:
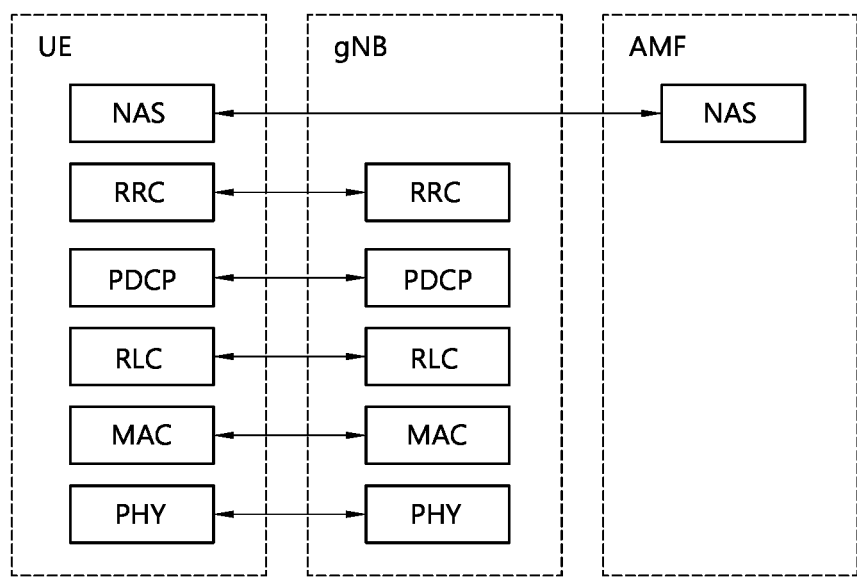

FIGS. 4A and 4B show a radio protocol architecture, based on an embodiment of the present disclosure. The embodiment of FIGS. 4A and 4B may be combined with various embodiments of the present disclosure. Specifically, FIG. 4A shows a radio protocol architecture for a user plane, and FIG. 4B shows a radio protocol architecture for a control plane. The user plane corresponds to a protocol stack for user data transmission, and the control plane corresponds to a protocol stack for control signal transmission.

Referring to FIGS. 4A and 4B, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
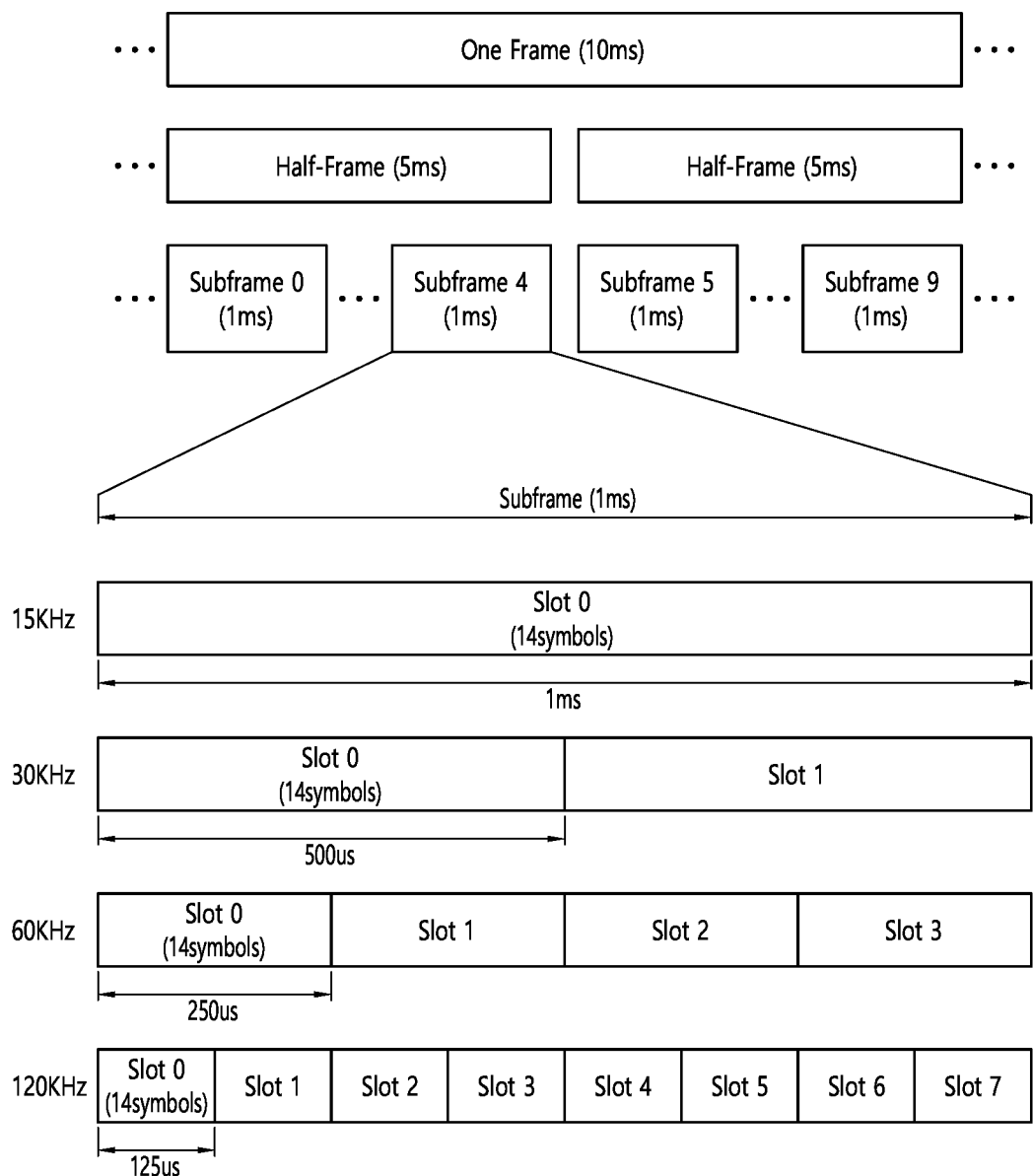
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15*2$^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15*2$^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
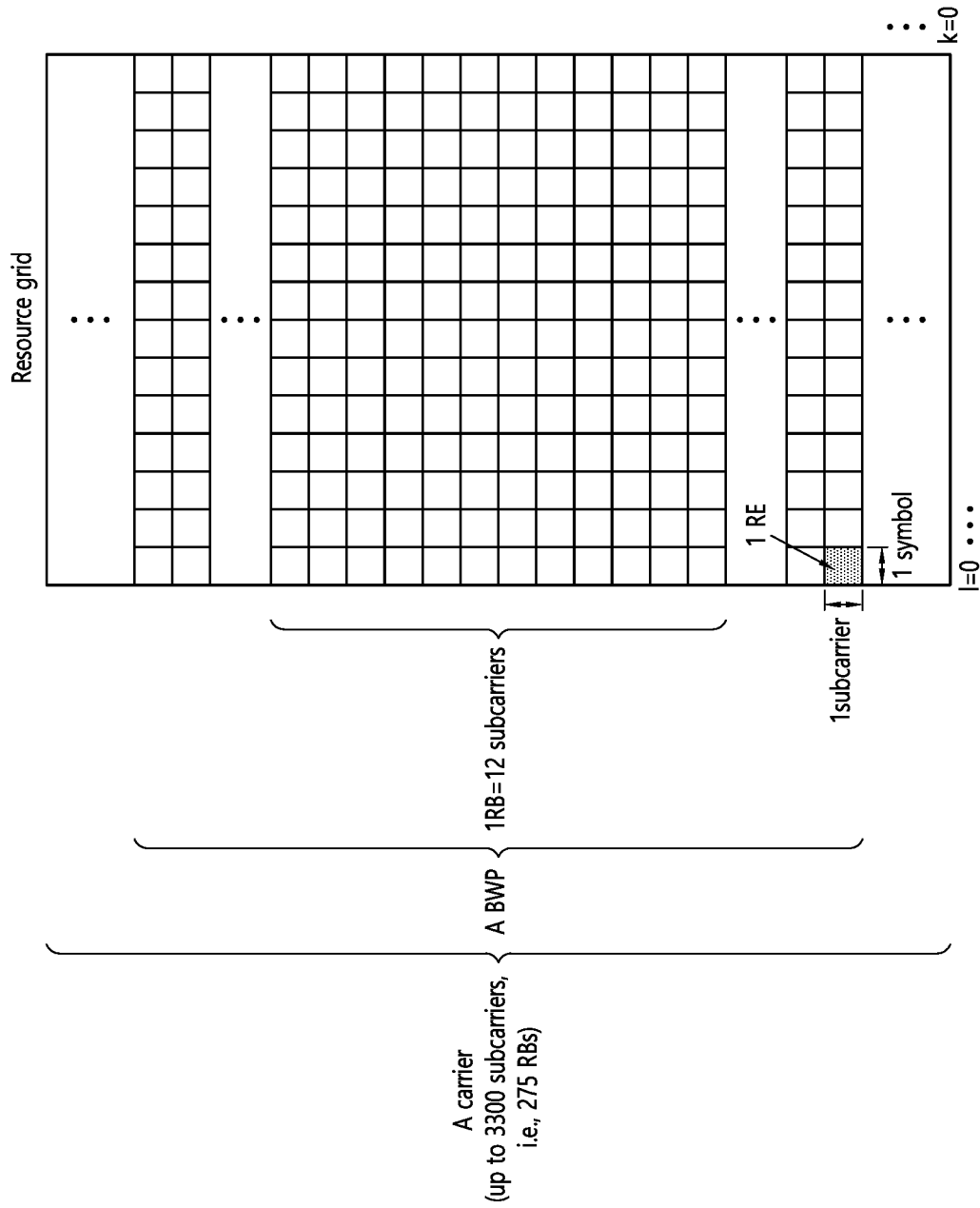
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
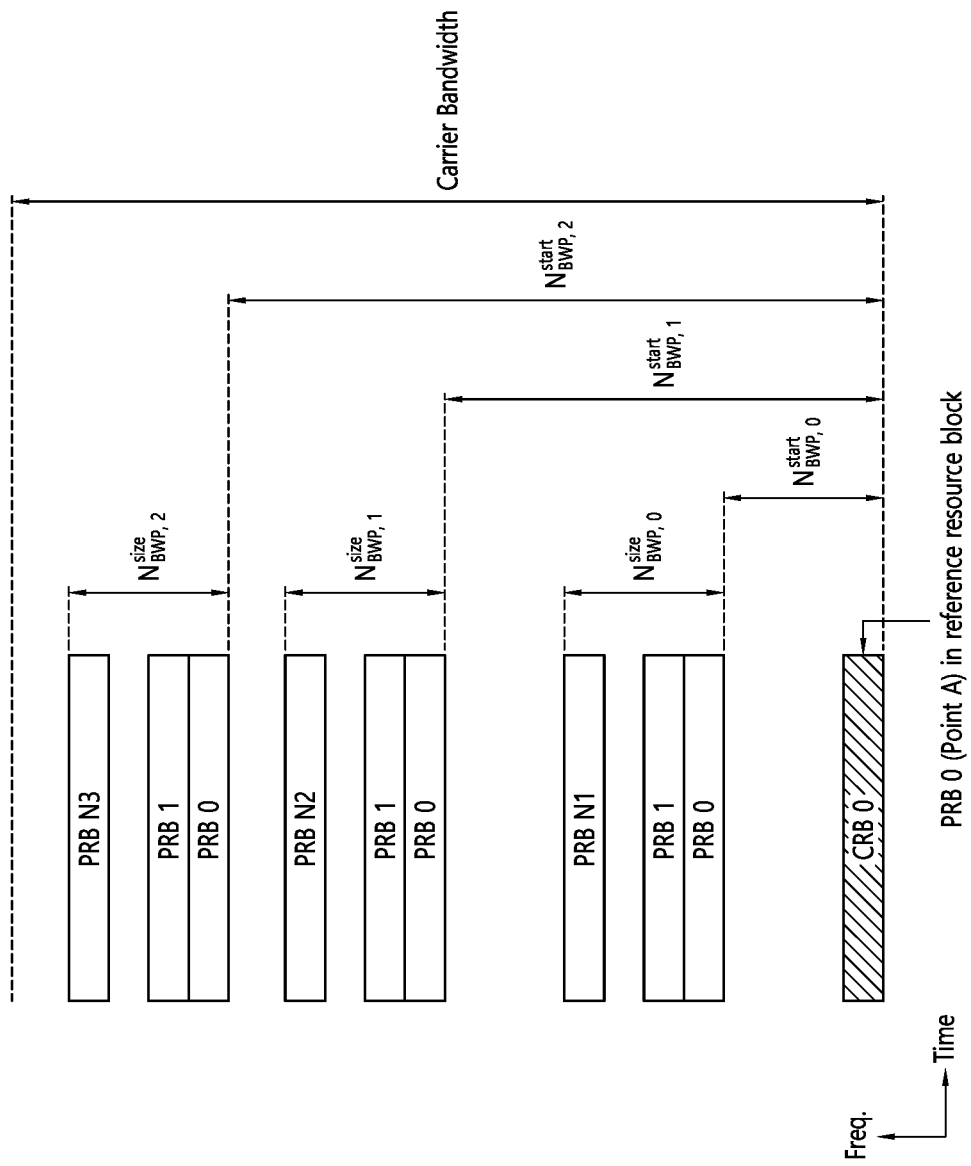
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8A:
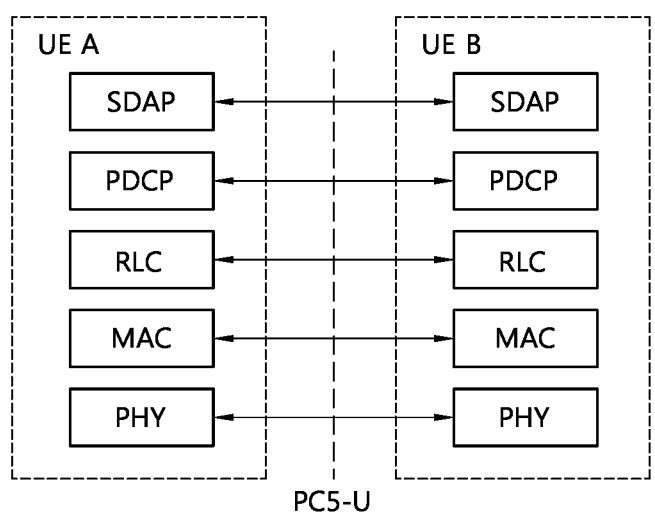
FIGS. 8A and 8B show a radio protocol architecture for a SL communication, based on an embodiment of the present disclosure.
Figure 8B:
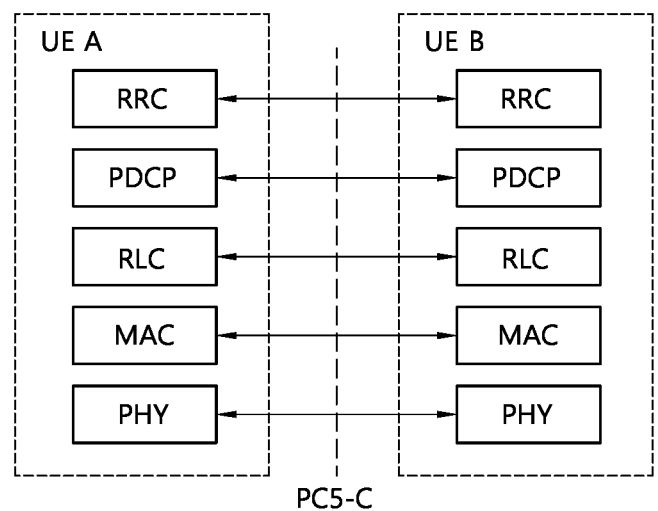

FIGS. 8A and 8B show a radio protocol architecture for a SL communication, based on an embodiment of the present disclosure. The embodiment of FIGS. 8A and 8B may be combined with various embodiments of the present disclosure. More specifically, FIG. 8A shows a user plane protocol stack, and FIG. 8B shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
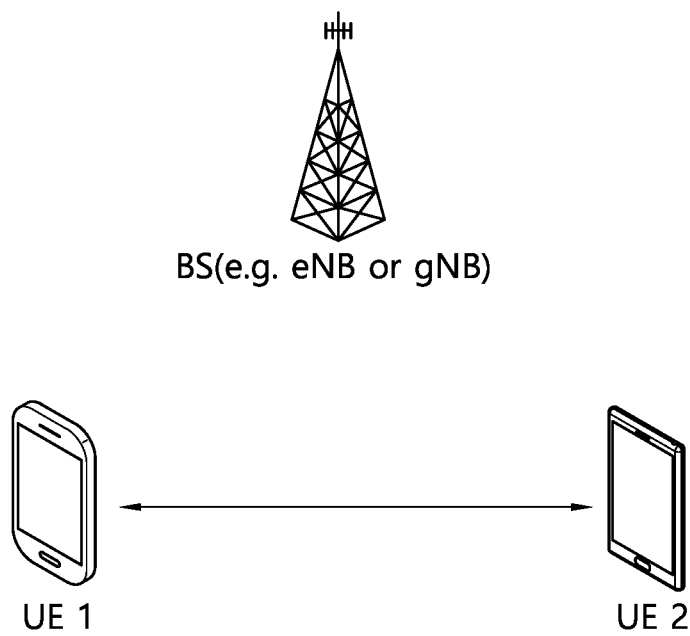
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10A:
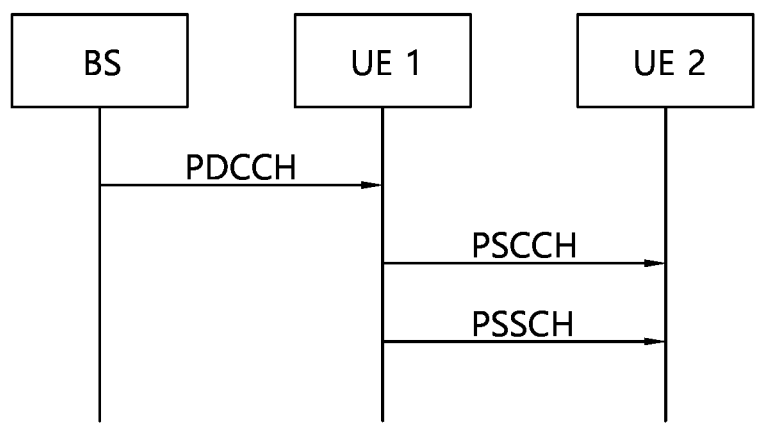
FIGS. 10A and 10B show a procedure of performing V2X or SL communication by a UE based on a transmission mode, based on an embodiment of the present disclosure.
Figure 10B:
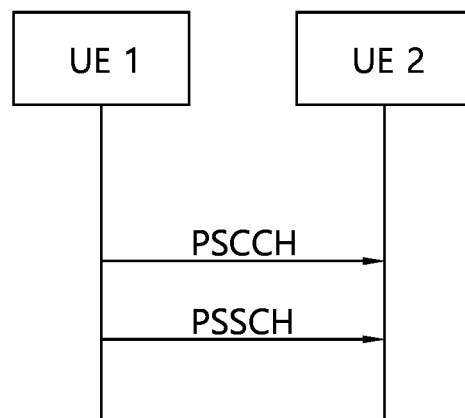

FIGS. 10A and 10B show a procedure of performing V2X or SL communication by a UE based on a transmission mode, based on an embodiment of the present disclosure. The embodiment of FIGS. 10A and 10B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10A shows a UE operation related to an LTE transmission mode 1 or an LTE transmission mode 3. Alternatively, for example, FIG. 10A shows a UE operation related to an NR resource allocation mode 1. For example, the LTE transmission mode 1 may be applied to general SL communication, and the LTE transmission mode 3 may be applied to V2X communication.

For example, FIG. 10B shows a UE operation related to an LTE transmission mode 2 or an LTE transmission mode 4. Alternatively, for example, FIG. 10B shows a UE operation related to an NR resource allocation mode 2.

Referring to FIG. 10A, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11A:
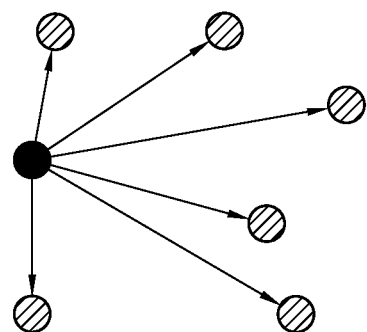
FIGS. 11A to 11C show three cast types, based on an embodiment of the present disclosure.
Figure 11B:
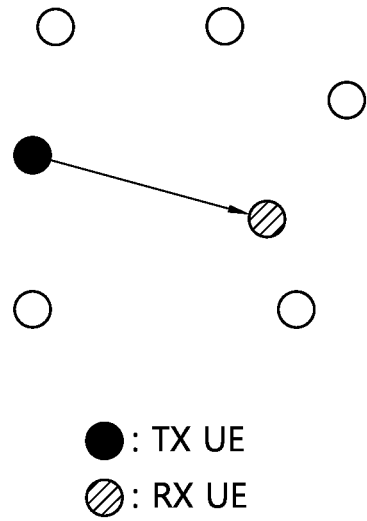
Figure 11C:
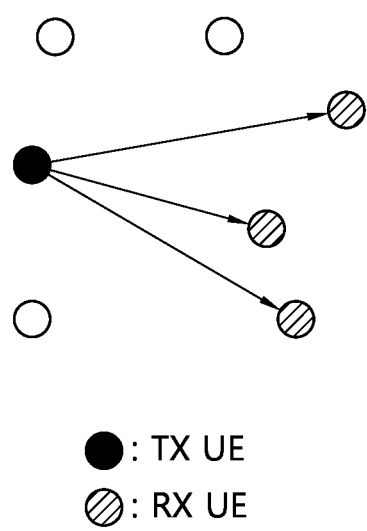

FIGS. 11A to 11C show three cast types, based on an embodiment of the present disclosure. The embodiment of FIGS. 11A to 11C may be combined with various embodiments of the present disclosure. Specifically, FIG. 11A shows broadcast-type SL communication, FIG. 11B shows unicast type-SL communication, and FIG. 11C shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

On the other hand, in sidelink communication, a UE needs to efficiently select a resource for sidelink transmission. Hereinafter, a method for a UE to efficiently select a resource for sidelink transmission and an apparatus supporting the same according to various embodiments of the present disclosure will be described. In various embodiments of the present disclosure, sidelink communication may include V2X communication.

At least one proposed method proposed according to various embodiments of the present disclosure may be applied to at least one of unicast communication, groupcast communication, and/or broadcast communication.

At least one proposal method proposed according to various embodiments of the present disclosure may be applied not only to sidelink communication or V2X communication based on PC5 interface or SL interface (e.g., PSCCH, PSSCH, PSBCH, PSSS/SSSS, etc.), but also to sidelink communication or V2X communication based on Uu interface (e.g., PUSCH, PDSCH, PDCCH, PUCCH, etc.).

In various embodiments of the present disclosure, a reception operation of a UE includes a decoding operation and/or reception operation of a sidelink channel and/or a sidelink signal (e.g., PSCCH, PSSCH, PSFCH, PSBCH, PSSS/SSSS, etc.). A reception operation of a UE may include a decoding operation and/or reception operation of a WAN DL channel and/or a WAN DL signal (e.g., PDCCH, PDSCH, PSS/SSS, etc.). A reception operation of a UE may include a sensing operation and/or a CBR measurement operation. In an embodiment of the present disclosure, a sensing operation of a UE may include PSSCH-RSRP measurement operation based on PSSCH DM-RS sequence, PSSCH-RSRP measurement operation based on PSSCH DM-RS sequence scheduled by PSCCH successfully decoded by a UE, sidelink RSSI (S-RSSI) measurement operation, and/or V2X resource pool related sub-channel-based S-RSSI measurement operation. In various embodiments of the present disclosure, a transmission operation of a UE may include a transmission operation of a sidelink channel and/or a sidelink signal (e.g., PSCCH, PSSCH, PSFCH, PSBCH, PSSS/SSSS, etc.). A UE's transmission operation may include transmission of a WAN UL channel and/or a WAN UL signal (e.g., PUSCH, PUCCH, SRS, etc.). In various embodiments of the present disclosure, a synchronization signal may include SLSS and/or PSBCH.

In various embodiments of the present disclosure, configuration may include signaling, signaling from a network, configuration from a network, and/or pre-configured configuration from a network. In various embodiments of the present disclosure, definition may include signaling, signaling from a network, configuration from a network, and/or pre-configuration from a network. In various embodiments of the present disclosure, designation may include signaling, signaling from a network, configuring from a network, and/or pre-configuring from a network.

In various embodiments of the present disclosure, ProSe Per Packet Priority (PPPP) may be replaced with ProSe Per Packet Reliability (PPPR), and PPPR may be replaced with PPPP. For example, a smaller PPPP value may mean a higher priority, and a larger PPPP value may mean a lower priority. For example, a smaller PPPR value may mean higher reliability, and a larger PPPR value may mean lower reliability. For example, a PPPP value related to a service, packet, or message related to a higher priority may be less than a PPPP value related to a service, packet, or message related to a lower priority. For example, a PPPR value related to a service, packet, or message related to high reliability may be less than a PPPR value related to a service, packet, or message related to low reliability.

In various embodiments of the present disclosure, a session may include at least one of an unicast session (for example, an unicast session for sidelink), a groupcast/multicast session (for example, a groupcast/multicast session for sidelink), and/or a broadcast session (for example, a broadcast session for sidelink).

In various embodiments of the present disclosure, a carrier may be interpreted as mutually extended to at least one of a BWP and/or a resource pool. For example, a carrier may include at least one of a BWP and/or a resource pool. For example, a carrier may include one or more BWPs. For example, a BWP may contain one or more resource pools.

Meanwhile, in unicast communication, when an L1 source ID related to a packet transmitted to a receiving UE by each of plurality of transmitting UEs (TX UE) having a PC5 RRC connection with the receiving UE (RX UE) is the same as each other, then the receiving UE performs SL HARQ feedback, SL CSI (or SL RSRP) measurement/reporting, and/or SL RLM (Sidelink Radio Link Monitoring) operation to a transmitting UE, a problem of confusion may occur. For example, an L1 source ID of a transmitting UE may be information corresponding to 8 bits of Least Significant Bit (LSB) of an L2 source ID. Specifically, for example, the problem may be more serious when an L1 destination ID related to the receiving UE included in the sidelink information transmitted by each of the plurality of transmitting UEs is the same. Here, for example, in order to alleviate the above-mentioned problem, a transmitting UE may allocate/signal a unique ID as an L1 destination ID to the receiving UE having a PC5 RRC connection. For example, the unique ID may not correspond to a part of the L2 destination ID of the transmitting UE.

Meanwhile, when an L1 destination IDs related to different service packets transmitted by each of a plurality of transmitting UEs to a receiving UE in groupcast communication are the same, when the receiving UE performs SL HARQ feedback, etc., a problem of confusion may occur. For example, the L1 source ID of the transmitting UE may be information corresponding to LSB 8 bits of an L2 source ID. Specifically, for example, even though a packet received by a receiving UE from a specific transmitting UE is a service packet of no interest, there may be a problem in that the receiving UE needs to perform SL HARQ feedback transmission to the specific transmitting UE.

On the other hand, in (connectionless) groupcast or broadcast communication, when a transmitting UE transmits/signals mutual resource scheduling information between reserved/scheduled transmission resources to a receiving UE (via SCI), an L1 source ID related to a packet transmitted by the transmitting UE may not be required. In this case, the connectionless groupcast may be a cast type in which a UE performs sidelink communication without establishing a PC5 RRC connection with one or more UEs in the group.

Hereinafter, a method for efficiently solving the above-described problems is proposed. In this case, the following suggested method or part of the following suggested method may be limitedly applied according to a pre-configured cast type, service type/type, service priority, and/or a signaling method of scheduling information between transmission resources. In addition, at this time, if some of the following proposed method or the following proposed method is applied, a transmitting UE may transmit an L1 ID having the same size as an L2 ID to a receiving UE through a specific SCI or by distributing it among a plurality of SCIs. An embodiment of the present disclosure may be established in various ways according to the following proposed method or a combination of the following proposed methods.

In an example, first SCI transmitted by a transmitting UE to a receiving UE may include an L1 destination ID field with pre-configured size (K1 bits), and second SCI may include the following fields ((A), (B)) or some of the following fields. In this case, for example, a receiving UE may perform a sensing operation based on first SCI received from a transmitting UE. Specifically, for example, a receiving UE may perform RSRP measurement for a PSSCH DMRS based on a decoding result for first SCI received from a transmitting UE. Therefore, for the purpose of preventing an increase in the number of blind decoding of a receiving UE, the size of first SCI may be configured/limited to the same size regardless of a cast type, a service type, a service priority, and/or a signaling method of scheduling information between transmission resources. Therefore, the size of an L1 destination ID field included in first SCI may also be configured/limited to the same size regardless of a cast type, a service type, a service priority, and/or a signaling method of scheduling information between transmission resources.

(A) L1 source ID field (K2 bit)

The K2 value may be pre-configured. For example, an L1 source ID information included in an L1 source ID field may be transmitted by scrambling (not in the form included in the payload of the second SCI) to second SCI related CRC bit. At this time, for example, if an L1 source ID with a size larger than K2 bits is configured or allocated, the (extra) excess bits may be transmitted through a pre-configured (L1 ID) field included in second SCI. Alternatively, for example, an L1 source ID information included in an L1 source ID field may be transmitted in a form included in a payload of second SCI. At this time, for example, when an L1 source ID with a size larger than K2 bits is configured or allocated, the (extra) excess bits may be scrambled to second SCI-related CRC bit and transmitted.

(B) (extra) L1 destination ID transmission field ((K3−K1) bit)

The (extra) L1 destination ID transmission field may be included in second SCI when an L1 destination ID having a larger size (K3 bits, where K3>K2 can be) than an L1 destination ID field size (K1 bit) included in first SCI is configured (by a network/base station or (PC5 RRC connected) UE). In this case, for example, when K3 value is the same as the size of an L2 destination ID (transmitted through a MAC PDU header) (K4 bits, e.g., K4=24 bits), it may be defined or configured so that the L2 destination ID is not included in a MAC PDU header. Alternatively, for example, even when K3 value is the same as the size of an L2 destination ID (transmitted through a MAC PDU header) (K4 bits, e.g., K4=24 bits), an L2 destination ID (of a pre-configured size and/or value) may be defined or configured to be transmitted through a MAC PDU header. Or, for example, when the K3 value is smaller than an L2 destination ID size (transmitted through a MAC PDU header), it may be defined or configured to include an (extra) L1 destination ID of (K4−K3) bits in a MAC PDU header. Or, for example, when the K3 value is smaller than an L2 destination ID size (transmitted through a MAC PDU header), it may be defined or configured so that an L2 destination ID (of a pre-configured size and/or value) is (still) included in a MAC PDU header. Or, for example, when the K3 value is smaller than an L2 destination ID size (transmitted through a MAC PDU header), it may be configured not to include an L2 destination ID in a MAC PDU header. Alternatively, for example, an L2 destination ID of (K3−K1) bits may be configured to be scrambled to a CRC bit of second SCI and transmitted. Alternatively, for example, the (K3−K1) bit L2 destination ID may be configured to be included in a MAC PDU header.

For example, the sum (TOT_SIZ) of the size of an L1 ID field included in first SCI and the size of an L1 ID field included in second SCI may be configured/fixed in advance, and within a range that does not exceed TOT_SIZ, the size of the L1 field included in first SCI and/or the size of the L1 ID field included in second SCI may be adjusted/configured (limitedly). In this case, for example, the adjustment range of the size of an L1 field included in first SCI and/or the adjustment range of the size of an L1 ID field included in second SCI may be configured differently, according to a signaling method of a cast type, service type, service priority and/or scheduling information between transmission resources, etc.

In another example, a transmitting UE may transmit or inform a receiving UE of (A) L1 ID information and (B) L2 ID information associated/linkage/mapped with (designated) L1 ID information (and/or information related to whether an L2 ID corresponding to a (designated) L1 ID information is transmitted through only a MAC PDU header) through predefined signaling (for example, PC5 RRC signaling). At this time, for example, an L2 ID is configured not to be transmitted through a MAC PDU header, or, a MAC PDU header may be configured to be transmitted (still) by including an L2 ID (of a pre-configured size and/or value). Alternatively, for example, information related to whether an L2 ID is transmitted only through a MAC PDU header and/or information on the size of an L2 ID may be specifically configured for a resource pool. And/or, for example, information related to whether an L2 ID is transmitted only through a MAC PDU header and/or information on the size of an L2 ID may be configured differently or independently, according to according to a signaling method of a cast type, a service type, service priority and/or scheduling information between transmission resources, etc. Or, for example, in a case of a UE that has not received ID information signaling to be used as an L1 ID, the UE may omit or not include an L1 ID field in SCI. Or, for example, in a case of a UE that has not received ID information signaling to be used as an L1 ID, the UE includes (still) an L1 ID field in SCI, wherein the size of the L1 ID field may be designated or configured to a pre-configured value, and an L2 ID may be defined or configured to be transmitted through a MAC PDU header, in order to match the size of an L1 ID field between SCI related to packets having different cast types, service types, service priorities, and/or signaling methods of scheduling information between transmission resources.

In another example (when an L1 destination ID field of a pre-configured size (K1 bits) exists on first SCI and at least one of (A) or (B) exists on second SCI, as in the example above), a transmitting UE may transmit or signal information (and/or information related to a type of an L1 ID field and/or information about the size of an L1 ID field) related to whether second SCI includes an L1 ID (e.g. L1 source ID, L1 destination ID, part of L1 destination ID) field to a receiving UE through a field predefined in first SCI. Here, for example, when a whether to SL HARQ feedback indicator field is included in first SCI, a transmitting UE may implicitly inform a receiving UE of the information or a part of the information through the whether to SL HARQ feedback indicator field. Specifically, for example, when SL HARQ feedback is indicated to a receiving UE as DISABLE through a whether to SL HARQ feedback indicator field, or a receiving UE is instructed not to perform SL HARQ feedback, the receiving UE may assume or determine that an (pre-configured) L1 ID field (e.g., L1 Source ID field) is not included in second SCI. In particular, for example, when mutual resource scheduling information is signaled between reserved/scheduled transmission resources (via SCI), the receiving UE may assume or determine that an (pre-configured) L1 ID field (e.g., L1 Source ID field) is not included in second SCI. Also, for example, a format of second SCI may be defined differently depending on whether a specific information field or the (partial) information field is included in the second SCI and/or the size value of a (partial) information field. And/or, for example, whether an L1 ID field (e.g., an L1 source ID field) is included in second SCI according to a second SCI format signaled through first SCI may be (implicitly) determined.

In another example, information related to whether SCI includes an L1 ID (e.g., L1 source ID, L1 destination ID, part of L1 destination ID) field (and/or information related to a type of an L1 ID field and/or information about the size of an L1 ID field) may be defined or configured differently or independently according to a method for signaling cast type, a service type, service priority and/or scheduling information between transmission resources. And/or, for example, information related to whether SCI includes an L1 ID (e.g., L1 source ID, L1 destination ID, part of L1 destination ID) field (and/or information related to a type of an L1 ID field and/or information about the size of an L1 ID field) may be defined or configured to be resource pool specific. In this case, for example, a reference value (REF_SIZ) for matching the size of an L1 ID field included in first SCI used for a sensing operation of a receiving UE may be configured. at this time, for example, when the size of an L1 ID field included in first SCI is configured to be larger than REF_SIZ, a part of the L1 ID corresponding to the same bit as the REF_SIZ may be transmitted through the first SCI, and a remaining part of the L1 ID corresponding to (extra) bits exceeding the REF_SIZ may be transmitted through the (L1 ID) field included in pre-configured second SCI. Or, for example, at this time, for example, when the size of an L1 ID field included in first SCI is configured to be larger than REF_SIZ, a part of the L1 ID corresponding to the same bit as the REF_SIZ may be transmitted through the first SCI, and a remaining part of the L1 ID corresponding to (extra) bits exceeding the REF_SIZ may be omitted or not transmitted.

In another example (when the above proposed method is applied), if there is no L1 ID to be included in SCI in (unconnected) groupcast/broadcast communication, it may be assumed or determined not to include an L1 ID field in the SCI, or an L1 ID field may not be included in the SCI. Alternatively, for example, if there is no L1 ID to be included in SCI in (unconnected) groupcast/broadcast communication, it is possible to configured or include a related field (e.g., L1 ID field) with a value configured in advance in SCI. For example, a case where L1 ID to be included in SCI does not exist may be a case where mutual resource scheduling information is signaled between reserved/scheduled transmission resources (via SCI), so that second SCI does not need to include an L1 source ID, in (unconnected) groupcast/broadcast communication.

According to the proposed method and the combination of the proposed methods, since the probability that a receiving UE receives different L1 IDs from a plurality of transmitting UEs increases, when the receiving UE performs SL HARQ feedback, SL CSI (or SL RSRP) measurement/reporting, and SL RLM operation, there may be an effect of not experiencing confusion. There may be an effect of not experiencing confusion when performing SL HARQ feedback, SL CSI (or SL RSRP) measurement/reporting, and SL RLM operation. In addition, the receiving UE can efficiently receive an L1 ID from a transmitting UE.

Figure 12:
FIG. 12 shows a method for a first device to transmit an SCI, according to an embodiment of the present disclosure.

FIG. 12 shows a method for a first apparatus to transmit an SCI, according to an embodiment of the present disclosure.

Referring to FIG. 12, in step S1210, a first apparatus may transmit first SCI and/or second SCI to a second apparatus. For example, the first SCI may include an L1 destination ID according to various embodiments proposed in the present disclosure. For example, the second SCI may include a part of an L1 source ID and/or the L1 destination ID according to various embodiments proposed in the present disclosure.

Additionally, for example, a first apparatus may transmit information on an L2 ID related to an L1 ID to a second apparatus. For example, a first apparatus may transmit information on whether an L2 ID related to an L1 ID is transmitted in a MAC PDU header to a second apparatus.

Additionally, for example, a first apparatus may transmit information on a field related to an L1 ID on the second SCI to a second apparatus by using a field on the first SCI. For example, the information on the field related to the L1 ID on the second SCI may include at least one of information on whether the field related to the L1 ID exists on the second SCI, information on a type of the field related to the L1 ID on the second SCI, and/or information related to the size of the field related to the L1 ID on the second SCI.

For example, the L1 ID may include at least one of an L1 source ID and/or an L1 destination ID. For example, the L2 ID may include at least one of an L2 source ID and/or an L2 destination ID.

The proposed method of FIG. 12 may be applied to an apparatus described below. A processor of a first apparatus may control a transceiver to transmit first SCI and/or second SCI to a second apparatus.

FIG. 13 shows a method for a second apparatus to receive an SCI, according to an embodiment of the present disclosure.

Referring to FIG. 13, in step S1310, a second apparatus may receive first SCI and/of second SCI from a first apparatus. For example, first SCI may include an L1 destination ID according to various embodiments proposed in the present disclosure. For example, second SCI may include a part of an L1 source ID and/or an L1 destination ID according to various embodiments proposed in the present disclosure.

Additionally, for example, a second apparatus may receive information on an L2 ID related to an L1 ID from a first apparatus. For example, a second apparatus may receive information on whether an L2 ID related to an L1 ID is transmitted in a MAC PDU header from a first apparatus.

Additionally, for example, a second apparatus may receive information about a field related to an L1 ID on second SCI from a first apparatus through a field on first SCI. For example, information on a field related to an L1 ID on second SCI may include at least one of information on whether the field related to the L1 ID exists on the second SCI, information on a type of the field related to the L1 ID on the second SCI, and/or information about the size of the field related to the L1 ID on the second SCI.

For example, the L1 ID may include at least one of an L1 source ID and/or an L1 destination ID. For example, the L2 ID may include at least one of an L2 source ID and/or an L2 destination ID.

The proposed method can be applied to an apparatus described below. A processor of a second apparatus may control a transceiver to receive first SCI and/or second SCI from a first apparatus.

Figure 14:
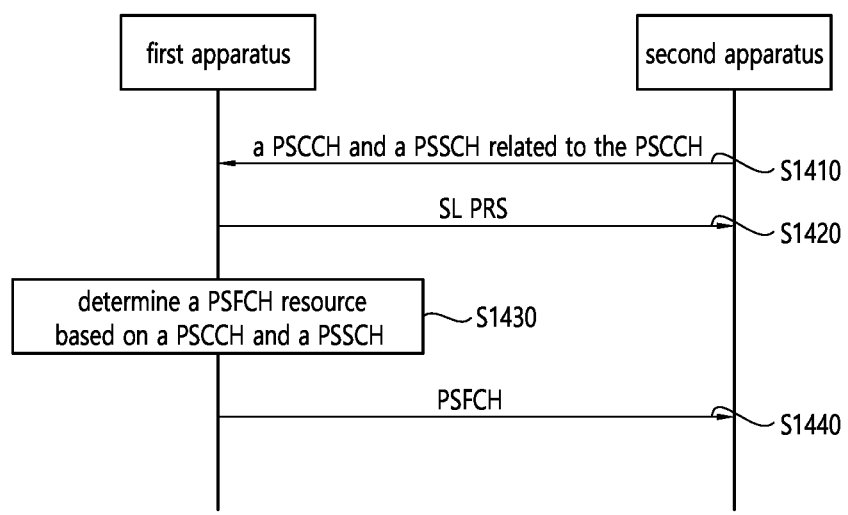
FIG. 14 shows a method for transmitting and receiving an SL PRS and a PSFCH by a first device and a second device according to an embodiment of the present disclosure.

FIG. 14 shows a method for transmitting and receiving an SL PRS and a PSFCH by a first apparatus and a second apparatus according to an embodiment of the present disclosure.

A first apparatus according to an embodiment may receive a Physical Sidelink Control Channel (PSCCH) and a Physical Sidelink Shared Channel (PSSCH) related to the PSCCH from a second apparatus (S1410). The first apparatus may transmit a Positioning Reference Signal (PRS) to the second apparatus (S1420), may determine a PSFCH (Physical Sidelink Feedback Channel) resource based on the PSCCH and the PSSCH (S1430), and may transmit the PSFCH to the second apparatus based on the PSFCH resource (S1440).

Hereinafter, various embodiments that may be directly or indirectly related to at least one of S1410 to S1440 will be reviewed.

In an embodiment, a transmitting UE may transmit a PSSCH and/or PSCCH to a receiving UE, and as a response to a PSSCH and/or a PSCCH, the transmitting UE may receive HARQ feedback from the receiving UE through a PSFCH resource within a specific slot. In this case, the receiving UE may (implicitly) determine a PSFCH resource for transmitting the HARQ feedback to the transmitting UE. Specifically, for example, a receiving UE may determine a frequency resource and/or a code resource of PSFCH within a configured resource pool. For example, a receiving UE may determine a PSFCH resource based on a slot index related to a PSCCH and/or a PSSCH received from a transmitting UE and/or a PSFCH to be transmitted. And/or, for example, a receiving UE may determine a PSFCH resource based on subchannel resources related to a PSCCH and/or a PSSCH received from a transmitting UE. And/or, for example, when each of a plurality of receiving UEs (or a plurality of receiving UEs included in the group) uses an independent or separate PSFCH resource to transmit a HARQ feedback (e.g., ACK or NACK) to a transmitting UE in a groupcast communication situation (hereinafter groupcast HARQ feedback option 2), a receiving UE may determine a PSFCH resource based on an identifier for distinguishing the plurality of receiving UEs. And/or, for example, a receiving UE may determine a PSFCH resource based on SL-RSRP, SL SINR, Layer-1 source ID and/or location information. In this case, a receiving UE having determined a PSFCH resource may transmit a HARQ feedback to a transmitting UE through the determined PSFCH resource.

Meanwhile, for example, in a groupcast communication situation, a plurality of receiving UEs (or all or part of a plurality of receiving UEs included in the group) may share a PSFCH resource for transmitting HARQ feedback to a transmitting UE (hereinafter groupcast HARQ feedback option 1).

Hereinafter, a multiplexing method for a PSFCH resource to solve a near-far problem and an inter-band emission problem, and a method for a receiving UE to efficiently determine a PSFCH resource are proposed. At this time, when groupcast HARQ feedback option 2 is supported, a set of PSFCH resources in which each of a plurality of receiving UEs (or a plurality of receiving UEs included in the group) transmits HARQ feedback may be called a PSFCH resource group.

Tables 5 to 7 below show descriptions of various embodiments related to PSFCH transmission or PRS transmission.

TABLE 5

Working assumption:
- When HARQ feedback is enabled for groupcast, support (options as identified in RAN1#95):
  - ✓ Option 1: Receiver UE transmits only HARQ NACK
  - ✓ Option 2: Receiver UE transmits HARQ ACK/NACK
- FFS applicability of option 1 and option 2 - this part is particulary relevant to confirm (or not) the working assumption Agreements:
- It is supported, in a resource pool, that within the slots associated with the resource pool, PSFCH resources can be (pre)configured periodically with a period of N slot(s)
  - ✓ N is configurable, with the following values
    - > 1
    - > At least one more value >1
      - FFS details
  - ✓ The configuration should also include the possibility of no resource for PSFCH. In this case, HARQ feedback for all transmissions in the resource pool is disabled
- HARQ feedback for transmissions in a resource pool can only be sent on PSFCH in the same resource pool Agreements:
- For the period of N slot(s) of PSFCH resource, N = 2 and N = 4 are additionally supported.

Agreements:
- For a PSSCH transmission with its last symbol in slot n, when the corresponding HARQ feedback is due for transmission, it is expected to be in slot n + a where a is the smallest integer larger than or equal to K with the condition that slot n + a contains PSFCH resources.
  - ✓ FFS details of K Table 5 discloses various examples of PSFCH resources, PSFCH transmission, etc. when HARQ feedback for groupcast support is activated.

TABLE 6

Proposals:
- For a PSFCH format,
  - ✓ In the symbols that can be used for PSFCH transmissions in a resource pool, a set of frequency resources is (pre-)configured for the actual use of PSFCH transmissions (i.e., PSFCH transmissions do not happen in other frequency resources).
    - > FFS: Frequency resource sets for PSFCH are separated depending on HARQ feedback option.
- For implicit mechanism for PSFCH resource determination,
  - ✓ In a resource pool, a combination of a sub-channel and a slot is associated with a PSFCH resource group
    - > A PSFCH resource group consist of one or multiple PSFCH resources
    - > PSFCH transmission corresponding to a PSSCH uses PSFCH resource(s) in the PSFCH resource group(s) that is associated with the slot(s) and sub-channels) used for the PSSCH.
    - > Support FDM between PSFCH resources used for HARQ feedback of PSSCH transmissions with different starting sub-channel in the same slot
      - FFS: In case of the number of PSFCH resources are not sufficient.
    - > Support FDM between PSFCH resources used for HARQ feedback of PSSCH transmissions with same or different starting sub-channel in different slots
      - FFS: In case of the number of PSFCH resources are not sufficient.
    - > For groupcast HARQ feedback Option 2, support CDM between PSFCH resources used by different RX UEs for HARQ feedback of the same PSSCH transmission
      - FFS: In case of the number of PSFCH resources are not sufficient.

At least the following two issues were raised during the offline discussions:
- K is the same for all the UEs in the resource pool?
- No PSSCH in the resource not reserved for PSFCH?

To facilitate the discussion, let me share my input on the two issues. For the first issue on K, it is unclear to me how PSFCH collision can be reduced/avoided in Mode 2. Mv understanding is that the proposal above tries to avoid PSFCH resource collision by using separate PSFCH resources for PSSCH transmissions using different slot or sub-channel (I think the proposal assumed that collision in PSSCH transmissions will be reduced by sensing). For the second issue on the usage of non-reserved resources, I think the majority view is not to use it for PSSCH and we can add "The frequency resources not included for the actual use of PSFCH transmissions are not used for PSSCH transmissions."

Table 6 discloses various examples related to PSFCH format, PSFCH resource determination, and the like.

TABLE 7

Observation 9: To support CBG-based HARQ feedback for NR side link, it is necessary to investigate following aspects:
• How to perform retransmission reservation
• How to transmit large payload size of HARQ codebook on a sequence-based PSFCH format
 Considering forward compatibility, it would be necessary to reserve resources in a slot where PSFCH resource is available. To be specific, it is possible to introduce new PSFCH format to support large payload size of HARQ feedback or other SFCI. Meanwhile, this new format will not support CDM with the PSFCH format in Rel-16. In this case, some portion of RBs in the PSFCH slot can be reserved. Another example is that other special RS such as sidelink PRS can be introduced.
Proposal 14: Support parts of RBs in PSFCH symbol(s) are reserved for future use.

Referring to Table 7 above, examples for supporting Code Block Group (CBG)-based HARQ feedback for NR sidelink are disclosed. That is, a method of performing retransmission reservation, a method of transmitting an HARQ codebook having a large payload size in a sequence-based PSFCH format, and the like are disclosed. Considering forward compatibility, it is necessary to reserve resources within a slot in which a PSFCH resource is valid. Specifically, it is possible to introduce a new PSFCH format to support HARQ feedback or other SCI of a large payload size. On the other hand, this new format may not support CDM of the Rel-16 PSFCH format. In this case, some of RBs in a PSFCH slot may be reserved. In another example, a specific RS, such as a sidelink PRS, may be used. In one example, supporting parts of RBs in PSFCH symbol(s) may be reserved (or withheld) for future use.

In an embodiment, with respect to a first proposal in Table 6, it may be useful to reserve some of frequency resources in symbols that may be used for PSFCH transmissions in a resource pool for future use. For example, when considering an additional PSFCH format, different PSFCH formats may be regarded as not being CDM. Specifically, to support a large payload size N and/or CBG-based HARQ feedback, a PSFCH format based on PUCCH format 2 may be considered. That is, reserved resources may be used to support FDM between a sequence-based PSFCH format and another PSFCH format. In another example, additional signaling such as PRS or wideband CSI-RS may be mapped to reserved resources. On the other hand, when reserved resources are not introduced, new channels or signals may not be mapped to symbols that can be used for PSFCH transmissions in a resource pool. Meanwhile, according to the above proposal, all frequency resources may be (pre-)configured for actual PSFCH transmission.

In an embodiment (as described above), when a PSFCH resource is reserved, various timelines may be supported (between a PSSCH (and/or PSCCH) transmission-related (time/frequency) resource and the PSFCH resource). That is, according to the proposed method and embodiment, a receiving UE may (pre)determine or reserve a PSFCH resource. In this case, one or more differences or timing relationships in the time domain between a resource related to PSSCH and/or PSCCH transmission of a transmitting UE and a PSFCH resource (pre)determined or reserved (in advance) by a receiving UE may be (pre)defined or (pre-)configured. In this case, the resource related to the PSSCH and/or PSCCH transmission may be a time resource and/or a frequency resource. As a specific example, according to (a plurality of) K values (configured on one resource pool), different reserved PSFCH resources may be used. That is, for example, when a transmitting UE transmits a PSSCH and/or a PSCCH to a receiving UE in a time resource (e.g., slot #n) related to PSSCH and/or PSCCH transmission, the receiving UE may transmit SL HARQ feedback to the transmitting UE in a PSFCH resource (e.g., slot #n+a). In this case, the a value may be an integer equal to the K value or a minimum integer greater than the K value. In this case, for example, the receiving UE may transmit an SL HARQ feedback to the transmitting UE on PSFCH resources (pre) determined or reserved (in advance) differently according to one or more K values configured on one resource pool.

In an embodiment, reserved resources for the purposes described above (e.g., legacy PSFCH format and CDM (and/or FDM) non-new PSFCH format resource configuration/security and/or configuring/securing resources related to (wide-band) reference signals (e.g., SL PRS for SL ranging/positioning, CSI-RS used for SL channel/interference estimation) for pre-configured purposes) may be (A) configured as part of a PSFCH resource (FDM (and/or TDM and/or CDM)), and/or (B) configured as a (partial) (time) resource (e.g., a symbol) that is not used for PSSCH (and/or PSCCH) (and/or PSFCH) purposes by adjusting a PSSCH (and/or PSCCH) (and/or PSFCH) (time) resource length on a slot. Here, for example, a PSSCH (and/or PSCCH) (and/or PSFCH) resource-related start (symbol) position and length information on a slot may be signaled in advance from a network (or base station) (pool specifically). That is, for example, when a plurality of PSFCH formats are defined, a UE may determine or reserve a resource (in advance) to configure or secure resources related to a specific or additional PSFCH format (e.g., a PSFCH format defined/designed based on PUCCH format 2). In this case, for example, the plurality of PSFCH formats may not be CDM (and/or FDM) to each other. And/or, for example, a UE may determine or reserve a resource (in advance) to establish or secure a resource related to a wide-band reference signal for a pre-configured purpose. In this case, for example, the reference signal may be an sidelink positioning reference signal (SL PRS) for sidelink ranging or positioning, an SL channel state information reference signal (CSI-RS) used for sidelink channel/interference estimation, etc. For example, when a UE determines or reserves a resource (in advance) for the above-mentioned purposes, the determined or reserved (in advance) resource may be configured/defined/determined as a part of a PSFCH resource. In this case, the determined or reserved (in advance) resource may be FDMed (and/or TDMed and/or CDMed) with a PSFCH resource in a PSFCH resource region. And/or, for example, when a UE determines or reserves a resource (in advance) for the above-mentioned purposes, the (pre)determined or reserved resource may be configured/defined/determined as a resource not used for PSSCH (and/or PSCCH and/or PSFCH) transmission, as a result of adjusting the length in the time domain of a PSSCH (and/or PSCCH and/or PSFCH) resource in a slot. In this case, for example, the (pre)determined or reserved resource may be configured/ defined/determined as all or part of a resource in the time domain (e.g., symbol). For example, a UE may receive in advance starting position information and resource length information related to a PSSCH (and/or PSCCH and/or PSFCH) transmission resource in a slot from a network or a base station. In this case, for example, the starting position information related to the PSSCH (and/or PSCCH and/or PSFCH) transmission resource in the slot may be information related to a start symbol position. For example, the starting position information and the resource length information related to the PSSCH (and/or PSCCH and/or PSFCH) transmission resource in the slot may be signaled in advance from a network or a base station to the UE in a pool-specific manner.

As another example, when reference signal (e.g., SL PRS, CSI-RS) transmission (and/or reception) and PSFCH transmission (and/or reception) (on FDM (and/or CDM) resources) on the above-described reserved resource (partially or fully) overlap in the time domain, (A) based on a pre-configured reference signal and/or PSFCH-related priority information (and/or related message (e.g., PSSCH) (or service or session) related priority information), transmission (and/or reception) of a relatively low priority may be omitted (and/or power is preferentially allocated to transmission of a relatively high priority (e.g., when a reference signal and a PSFCH transmission must be performed simultaneously, and the sum of the required power is greater than the maximum transmission power of a UE)), and/or (B) it is possible to always perform a pre-configured signal/channel (e.g. SL PRS or CSI-RS or PSFCH) related transmission (and/or reception) operation (and/or power allocation) with priority. That is, for example, when reference signal (e.g., SL PRS, SL CSI-RS) transmission (and/or reception) and PSSCH transmission (and/or reception) of a UE partially or fully overlap on the (pre)determined or reserved resource above in the time domain, a UE may not perform transmission (and/or reception) having a relatively low priority, but may only perform transmission (and/or reception) having a relatively high priority, based on pre-configured or received priority-related information. And/or, for example, when reference signal (e.g., SL PRS, SL CSI-RS) transmission (and/or reception) and PSSCH transmission (and/or reception) of a UE partially or fully overlap on the (pre)determined or reserved resource above in the time domain, a UE may preferentially allocate transmission power to transmission having a relatively high priority based on pre-configured or received priority-related information. Specifically, for example, the above operation may be performed when the sum of required power is greater than the maximum transmission power of a UE in a situation in which the UE needs to perform transmission of a reference signal and transmission of a PSFCH in the same time resource. At this time, the priority information may be at least one of priority information related to a reference signal, priority information related to PSFCH, message (e.g., PSSCH) (related to/interlocked with PSFCH), or priority information related to service or session. And/or, for example, when reference signal (e.g., SL PRS, SL CSI-RS) transmission (and/or reception) and PSSCH transmission (and/or reception) of a UE partially or fully overlap on the (pre)determined or reserved resource above in the time domain, a UE may always preferentially perform a transmission (and/or reception) operation related to a previously configured or defined signal/channel. And/or, for example, when reference signal (e.g., SL PRS, SL CSI-RS) transmission (and/or reception) and PSSCH transmission (and/or reception) of a UE partially or fully overlap on the (pre)determined or reserved resource above in the time domain, a UE may always preferentially allocate transmission power to transmission (and/or reception) related to a pre-configured or defined signal/channel (e.g., SL PRS or SL CSI-RS or PSFCH).

In another embodiment, in a case of the above-described SL PRS (and/or CSI-RS), for multiplexing with PSFCH resources (e.g., CDM, FDM), a PSFCH sequence type may be similarly (or identically) used. As a specific example, after selecting a pre-configured size/number of RBs (among PSFCH resources) at a (pre-configured) specific (or constant) interval, a sequence having a shape/type similar (or the same) to a PSFCH sequence may be transmitted on each selected RB for SL PRS (and/or CSI-RS) purpose. In this case, for example, it may be in a form similar to IFDMA, thereby reducing a PAPR increase problem. Here, as another example, it is possible to select/use (limitedly) (and/or select/use (limitedly) a cyclic shift value that is expected to have the lowest (or respectively lower) probability of collision (and/or a base sequence value and/or a resource set (e.g., RB SET))) an unused cyclic shift value (via sensing, etc. or pre-configured) (and/or base sequence values) to avoid collision with PSFCH (resource) used for (actual) SL HARQ feedback transmission/reception purpose. That is, for example, when a UE transmits (and/or receives) an SL PRS (and/or an SL CSI-RS) in a (pre)determined or reserved resource, the UE may generate and transmit an SL PRS (and/or an SL CSI-RS) sequence of a shape/type similar to (or identical to) a PSFCH sequence in order to multiplex (e.g., CDM, FDM, etc.) the (pre)determined or reserved resource and the PSFCH resource. Specifically, for example, a UE may select/determine a pre-configured size/number of resource blocks (RBs) (in a PSFCH resource), and generate/transmit an SL PRS (and/or an SL CSI-RS) sequence of a shape/type similar to (or identical to) a PSFCH sequence on the selected/determined RB. In this case, the RBs may be selected/determined at a specific (pre-configured) interval or at a regular interval. At this time, for example, a UE may create a SL PRS (and/or SL CSI-RS) sequence by selecting or using an unused cyclic shift value and/or a base sequence value (limitedly), in order to avoid collision or overlap between a resource through which a UE transmits an SL PRS (and/or an SL CSI-RS) and a PSFCH resource through which (actually) SL HARQ feedback is transmitted/received. In this case, for example, the unused cyclic shift value may be derived/obtained/determined, or pre-configured, such as a sensing operation of a UE. And/or, for example, a UE may generate an SL PRS (and/or an SL CSI-RS) sequence by (limitedly) selecting or using cyclic shift values and/or base sequence values and/or resource sets (e.g., RB sets) that are expected to have the lowest (or relatively lower) probability of collision or overlap, in order to avoid collision or overlap between a resource through which a UE transmits an SL PRS (and/or an SL CSI-RS) and a PSFCH resource through which (actually) SL HARQ feedback is transmitted/received.

Tables 8 and 9 below show various embodiments related to multiplexing of PSFCH resources.

TABLE 8

On the multiplexing scheme for PSFCH resources, it is necessary to consider near-far problem and inter-band emission problem. To be specific, different PSSCH transmissions with different pair of starting (and/or ending) sub-channel and slot can be associated with different TX UE-RX UE pairs. In this case, CDM between different PSFCH transmissions will cause near-far problem. In this point of view, it is preferred to prioritize FDM for multiplexing scheme for PSFCH resources associated with different PSSCH transmissions.

Next, it needs to consider to separate PSFCH resources associated with different (and/or partially overlapped and/or fully overlapped) PSSCH transmissions with the same pair of starting (and/or ending) sub-channel and slot. To be specific, considering Mode 2 operation, different TX UE can use the same (and/or partially overlapped and/or fully overlapped) resources for different PSSCH transmissions. Meanwhile, RX UE could distinguish these two different PSSCH opportunistically. In this case, to avoid additional PSFCH resource collision, it can be considered that the PSFCH resources associated with these different PSSCH transmissions with resource (partially and/or fully) overlapping are separated. In our view, implicit mechanism is used to select a PSFCH resource within a PSFCH resource group.

Regarding groupcast HARQ feedback Option 2, it needs to consider that any pair of starting (and/or ending) sub-channel and slot can be used for unicast, groupcast option 1, or groupcast option 2. In other words, if groupcast HARQ feedback Option 2 is supported in a resource pool, it is necessary that a single PSSCH transmission can be associated with multiple PSFCH resources. In other words, the PSFCH resource group can consist of multiple PSFCH resources.

Meanwhile, when the number of RX UEs in a group is large, the size of PSFCH resource group could be large as well. To bypass this problem, it can be considered to support CDM for multiplexing different PSFCH resources for the same PSSCH transmission (for groupcast Option 2). In addition, multiple PSFCH resource groups associated with the same PSSCH transmission can be used to support groupcast HARQ feedback Option 2. In other words, as the number of sub-channels for PSSCH transmission increases, the number of PSFCH resource groups to be used for HARQ feedback can increases. In this case, large number of RX UEs in a group can be supported by PSSCH transmission with multiple sub-channel allocation. Regarding the near-far problem, since multiple RX UE will transmit PSFCH to the same TX UE, it may be mitigated depending on the PSFCH power control scheme if necessary.

TABLE 9

In those points of views, we are fine to support both CDM and FDM between PSFCH resources used by different RX UEs for HARQ feedback of the same PSSCH transmission for groupcast Option 2.

On the issue whether K is the same for all the UEs in the resource pool, it needs to consider the impact on the sensing operation. The motivation of implicit mechanism of PSFCH resource determination including timing is that RX UE does not need to perform additional sensing operation of PSFCH transmission even if the RX UE fails SCI decoding. Considering that each pair of sub-channel and slot in a resource pool can be used by any TX UEs with different K, even though different PSSCH transmissions are not collided, PSFCH resource collision avoidance will not be always guaranteed. If implicit mechanism for PSFCH resource determination is designed considering multiple values of K, it seems equivalent to the case where the HARQ bundling window size increases further. For instance, when the values of Ks are K1, K2, and K3, the final HARQ bundling window will be the union of HARQ bundling window associated with K1, K2, and K3. However, in this case, large number of PSFCH resources need to be reserved, which can cause PSFCH resource shortage, and HARQ-ACK payload size can be unnecessarily large. In those point of view, it is unclear that the benefit of having multiple values of K in a resource pool. In this case, we prefer that K is the same for all the UEs in the resource pool.

On the last question, considering AGC issue, we are fine to add "The frequency resources not included for the actual use of PSFCH transmissions are not used for PSSCH transmissions."

In our view, it would be useful to send LS to RAN4 to ask how many PRB are needed for a sequence-based PSFCH format and other potential format (e.g. PUCCH format 2-based) considering AGC settling time.

According to an embodiment of the present disclosure, a transmitting UE may transmit sidelink information to a receiving UE through a PSSCH. For example, according to the method, procedure and/or embodiment proposed in the present disclosure, a transmitting UE may receive HARQ feedback for sidelink information, transmitted through a PSSCH, through a PSFCH resource determined by a receiving UE.

According to an embodiment of the present disclosure, a receiving UE may receive sidelink information from a transmitting UE through a PSSCH. For example, a receiving UE may determine a PSFCH resource for transmitting HARQ feedback for sidelink information received through a PSSCH according to the method, procedure, and/or embodiment proposed in the present disclosure. For example, a receiving UE may transmit HARQ feedback to a transmitting UE through a determined PSFCH resource.

Figure 15:
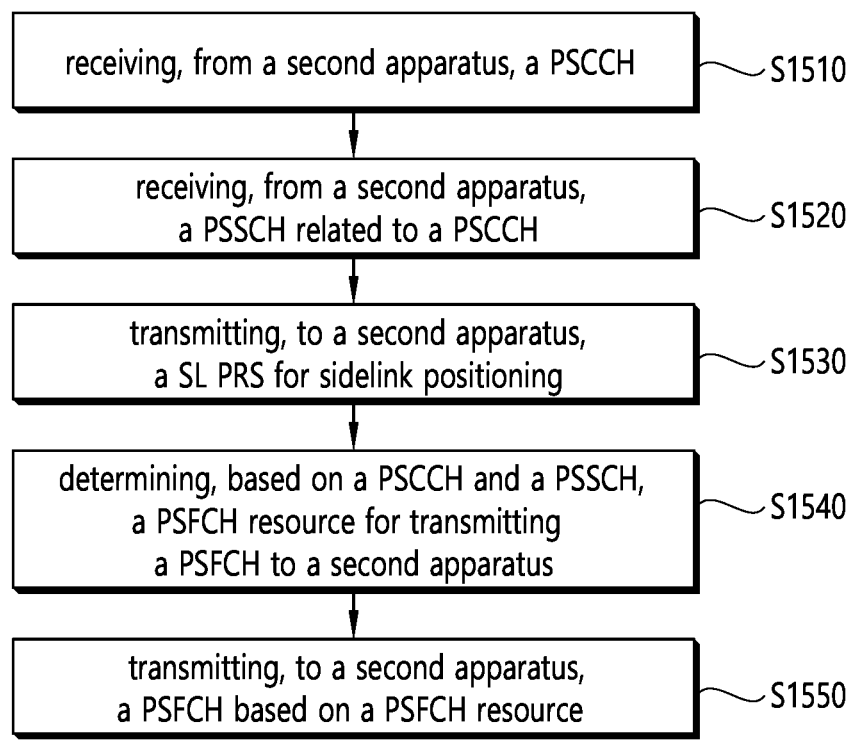
FIG. 15 is a flowchart showing an operation of a first device according to an embodiment of the present disclosure.

FIG. 15 is a flowchart showing an operation of a first apparatus according to an embodiment of the present disclosure.

The operations disclosed in the flowchart of FIG. 15 may be performed in combination with various embodiments of the present disclosure. In one example, operations disclosed in the flowchart of FIG. 15 may be performed based on at least one of the devices illustrated in FIGS. 17 to 22. In one example, a first apparatus of FIG. 15 may correspond to a first wireless device 100 of FIG. 18 to be described later. In another example, a first apparatus of FIG. 15 may correspond to a second wireless device 200 of FIG. 18 to be described later.

In step S1510, a first apparatus according to an embodiment may receive, from a second apparatus, a physical sidelink control channel (PSCCH).

In step S1520, a first apparatus according to an embodiment may receive, from the second apparatus, a physical sidelink shared channel (PSSCH) related to the PSCCH.

In step S1530, a first apparatus according to an embodiment may transmit, to the second apparatus, a sidelink positioning reference signal (SL PRS) for sidelink positioning.

In step S1540, a first apparatus according to an embodiment may determine, based on the PSCCH and the PSSCH, a physical sidelink feedback channel (PSFCH) resource for transmitting a PSFCH to the second apparatus.

In step S1550, a first apparatus according to an embodiment may transmit, to the second apparatus, the PSFCH based on the PSFCH resource.

In an embodiment, a time interval in which the SL PRS is transmitted and a time interval in which the PSFCH is transmitted may overlap each other.

In an embodiment, the SL PRS and the PSFCH may be transmitted to the second apparatus on a same slot.

In an embodiment, a frequency interval in which the SL PRS is transmitted and a frequency interval in which the PSFCH is transmitted may not overlap each other.

In an embodiment, a frequency interval in which the SL PRS is transmitted may be reserved in advance.

In an embodiment, power allocation for a transmission of the SL PRS may be prioritized between the transmission of the SL PRS and a transmission of the PSFCH.

In an embodiment, based on a priority information on the SL PRS and a priority information on the PSFCH, power allocation for a transmission having a relatively high priority between a transmission of the SL PRS and a transmission of the PSFCH may be prioritized.

In an embodiment, a sequence form or a sequence type of the SL PRS may be the same as a sequence form or a sequence type of the PSFCH.

In an embodiment, a degree of similarity between a sequence form or a sequence type of the SL PRS and a sequence type or a sequence type of the PSFCH may be equal to or more than a pre-defined threshold degree.

In an embodiment, a time interval in which the SL PRS is transmitted and a time interval in which the PSFCH is transmitted may be the same as each other.

In an embodiment, a time interval in which the SL PRS is transmitted and a time interval in which the PSFCH is transmitted partially may overlap each other.

According to an embodiment of the present disclosure, a first apparatus for performing sidelink communication may be provided. The first apparatus may comprise: one or more memories storing instructions, one or more transceivers and one or more processors connected to the one or more memories and the one or more transceivers. For example, the one or more processors may execute the instructions to: receive, from a second apparatus, a physical sidelink control channel (PSCCH); receive, from the second apparatus, a physical sidelink shared channel (PSSCH) related to the PSCCH; transmit, to the second apparatus, a sidelink positioning reference signal (SL PRS) for sidelink positioning; determine, based on the PSCCH and the PSSCH, a physical sidelink feedback channel (PSFCH) resource for transmitting a PSFCH to the second apparatus; and transmit, to the second apparatus, the PSFCH based on the PSFCH resource, wherein a time interval in which the SL PRS is transmitted and a time interval in which the PSFCH is transmitted overlap each other.

According to an embodiment of the present disclosure, an apparatus (or a chip(set)) configured to control a first user equipment (UE), the apparatus may comprise: one or more processors; and one or more memories operably connected to the one or more processors and storing instructions. For example, the one or more processors may execute the instructions to: receive, from a second UE, a physical sidelink control channel (PSCCH); receive, from the second UE, a physical sidelink shared channel (PSSCH) related to the PSCCH; transmit, to the second UE, a sidelink positioning reference signal (SL PRS) for sidelink positioning; determine, based on the PSCCH and the PSSCH, a physical sidelink feedback channel (PSFCH) resource for transmitting a PSFCH to the second UE; and transmit, to the second UE, the PSFCH based on the PSFCH resource, wherein a time interval in which the SL PRS is transmitted and a time interval in which the PSFCH is transmitted overlap each other.

In an example, the first UE in the above embodiment may refer to the first apparatus described in the first half of the present disclosure. In an example, the one or more processors, the one or more memories, etc. in the apparatus for controlling the first UE may be implemented as separate sub-chips, or at least two or more components may be implemented through one sub-chip.

According to an embodiment of the present disclosure, a non-transitory computer-readable storage medium storing instructions may be proposed. For example, the instructions, when executed, may cause a first apparatus to: receive, from a second apparatus, a physical sidelink control channel (PSCCH); receive, from the second apparatus, a physical sidelink shared channel (PSSCH) related to the PSCCH; transmit, to the second apparatus, a sidelink positioning reference signal (SL PRS) for sidelink positioning; determine, based on the PSCCH and the PSSCH, a physical sidelink feedback channel (PSFCH) resource for transmitting a PSFCH to the second apparatus; and transmit, to the second apparatus, the PSFCH based on the PSFCH resource, wherein a time interval in which the SL PRS is transmitted and a time interval in which the PSFCH is transmitted overlap each other.

Figure 16:
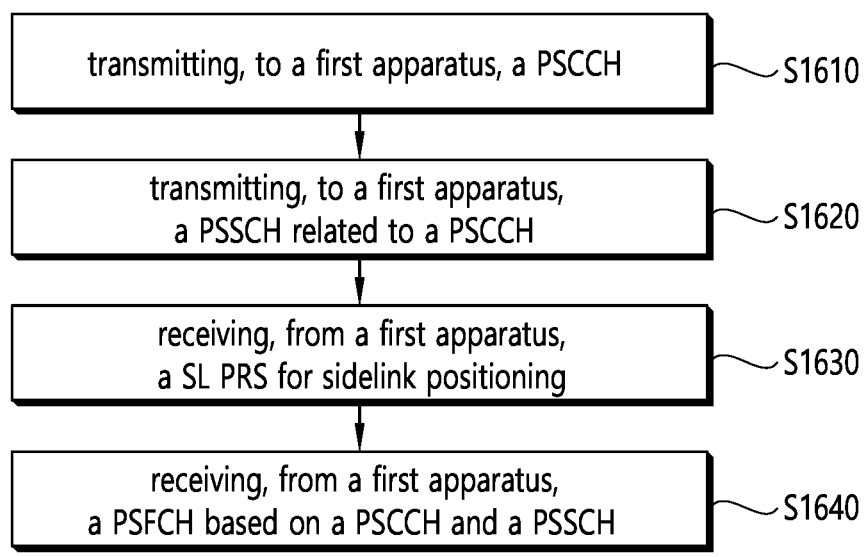
FIG. 16 is a flowchart showing an operation of a second device according to an embodiment of the present disclosure.

FIG. 16 is a flowchart showing an operation of a second apparatus according to an embodiment of the present disclosure.

Operations disclosed in the flowchart of FIG. 16 may be performed in combination with various embodiments of the present disclosure. In one example, operations disclosed in the flowchart of FIG. 16 may be performed based on at least one of devices illustrated in FIGS. 17 to 22. In one example, a second apparatus of FIG. 16 may correspond to a second wireless device 200 of FIG. 18 to be described later. In another example, a second apparatus of FIG. 16 may correspond to a first wireless device 100 of FIG. 18 to be described later.

In step S1610, a second apparatus according to an embodiment may transmit, to a first apparatus, a physical sidelink control channel (PSCCH).

In step S1620, a second apparatus according to an embodiment may transmit, to the first apparatus, a physical sidelink shared channel (PSSCH) related to the PSCCH.

In step S1630, a second apparatus according to an embodiment may receive, from the first apparatus, a sidelink positioning reference signal (SL PRS) for sidelink positioning.

In step S1640, a second apparatus according to an embodiment may receive, from the first apparatus, the PSFCH based on the PSCCH and the PSSCH.

In an embodiment, a time interval in which the SL PRS is transmitted and a time interval in which the PSFCH is transmitted may overlap each other.

In an embodiment, the SL PRS and the PSFCH may be transmitted to the second apparatus on a same slot.

In an embodiment, a frequency interval in which the SL PRS is transmitted and a frequency interval in which the PSFCH is transmitted may not overlap each other.

In an embodiment, a frequency interval in which the SL PRS is transmitted may be reserved in advance.

In an embodiment, power allocation for a transmission of the SL PRS may be prioritized between the transmission of the SL PRS and a transmission of the PSFCH.

In an embodiment, based on a priority information on the SL PRS and a priority information on the PSFCH, power allocation for a transmission having a relatively high priority between a transmission of the SL PRS and a transmission of the PSFCH may be prioritized.

In an embodiment, a sequence form or a sequence type of the SL PRS may be the same as a sequence form or a sequence type of the PSFCH.

In an embodiment, a degree of similarity between a sequence form or a sequence type of the SL PRS and a sequence type or a sequence type of the PSFCH may be equal to or more than a pre-defined threshold degree.

In an embodiment, a time interval in which the SL PRS is transmitted and a time interval in which the PSFCH is transmitted may be the same as each other.

In an embodiment, a time interval in which the SL PRS is transmitted and a time interval in which the PSFCH is transmitted partially may overlap each other.

According to an embodiment of the present disclosure, a second apparatus configured to perform wireless communication may be proposed. For example, the second apparatus may comprise: one or more memories storing instructions; one or more transceivers; and one or more processors connected to the one or more memories and the one or more transceivers. For example, the one or more processors may execute the instructions to: transmit, to a first apparatus, a physical sidelink control channel (PSCCH); transmit, to the first apparatus, a physical sidelink shared channel (PSSCH) related to the PSCCH; receive, from the first apparatus, a sidelink positioning reference signal (SL PRS) for sidelink positioning; and receive, from the first apparatus, the PSFCH based on the PSCCH and the PSSCH, wherein a time interval in which the SL PRS is transmitted and a time interval in which the PSFCH is transmitted overlap each other.

Various embodiments of the present disclosure may be implemented independently. Alternatively, various embodiments of the present disclosure may be implemented in combination with or merged with each other. For example, various embodiments of the present disclosure have been described based on the 3GPP system for convenience of description, but various embodiments of the present disclosure may be extendable to systems other than the 3GPP system. For example, various embodiments of the present disclosure are not limited to direct communication between UEs, and may be used in uplink or downlink, in this case, a base station or a relay node may use the method proposed according to various embodiments of the present disclosure. For example, information on whether the method according to various embodiments of the present disclosure is applied may be defined to be informed by a base station to a UE or by a transmitting UE to a receiving UE through a predefined signal (e.g., a physical layer signal or an upper layer signal). For example, information on rules according to various embodiments of the present disclosure may be defined to be informed by a base station to a UE or a by a transmitting UE to a receiving UE through a predefined signal (e.g., a physical layer signal or an upper layer signal). For example, among various embodiments of the present disclosure, some embodiments may be limitedly applied only to resource allocation mode 1. For example, among various embodiments of the present disclosure, some embodiments may be limitedly applied only to resource allocation mode 2.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 17:
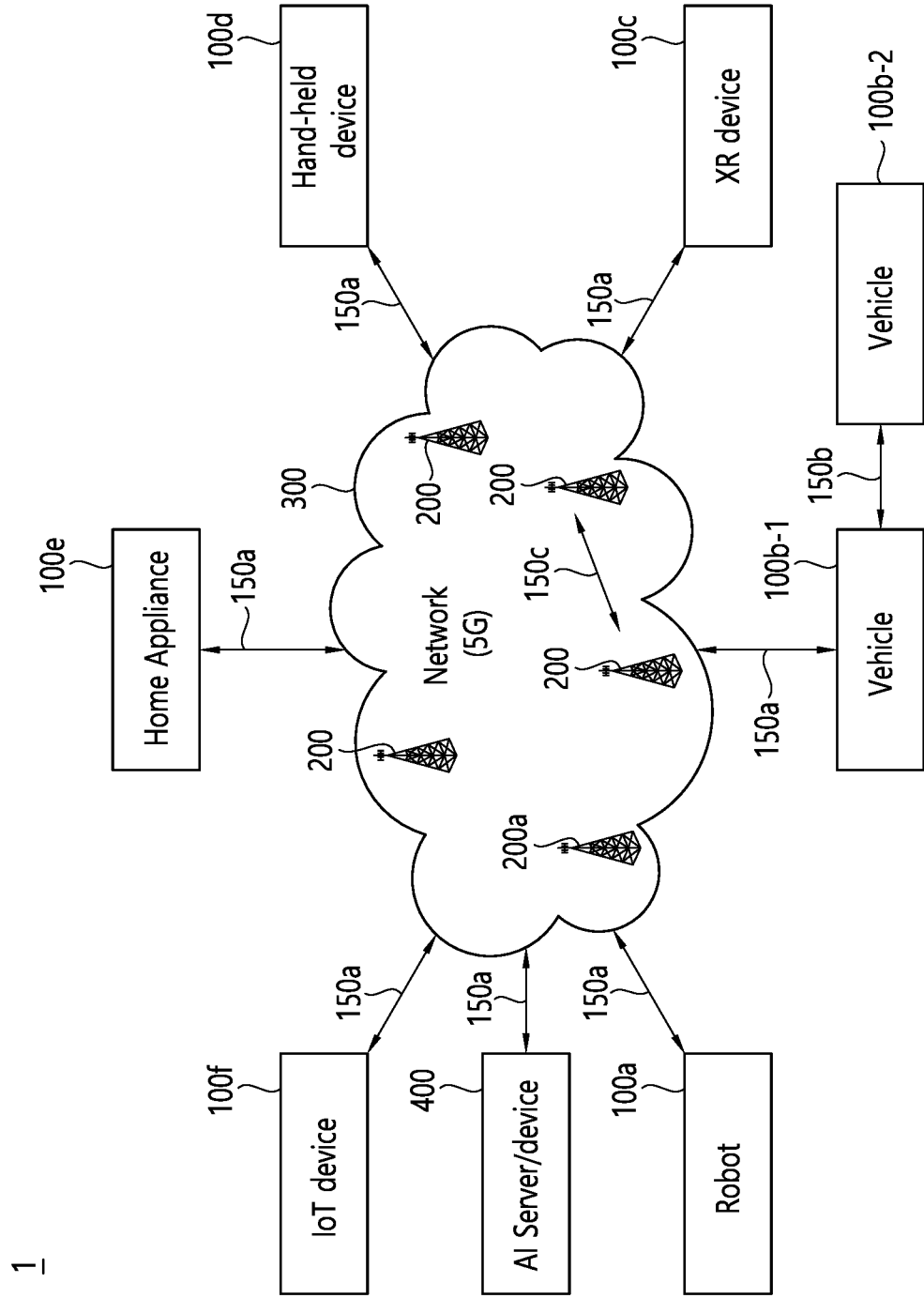
FIG. 17 shows a communication system 1, based on an embodiment of the present disclosure.

FIG. 17 shows a communication system 1, based on an embodiment of the present disclosure.

Referring to FIG. 17, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless devices 100a to 100f may be connected to a network 300 through a base station 200. Artificial intelligence (AI) technology may be applied to wireless devices 100a to 100f, and wireless devices 100a to 100f may be connected to an AI server 400 through a network 300. A network 300 may be configured using a 3G network, a 4G (e.g., LTE) network, or a 5G (e.g., NR) network. Wireless devices 100a to 100f may communicate with each other through a base station 200/network 300, but may also communicate directly (e.g., sidelink communication) without passing through a base station/network. For example, vehicles 100b-1 and 100b-2 may perform direct communication (e.g., Vehicle to Vehicle (V2V)/Vehicle to everything (V2X) communication). In addition, an IoT device (e.g., sensor) may directly communicate with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 18:
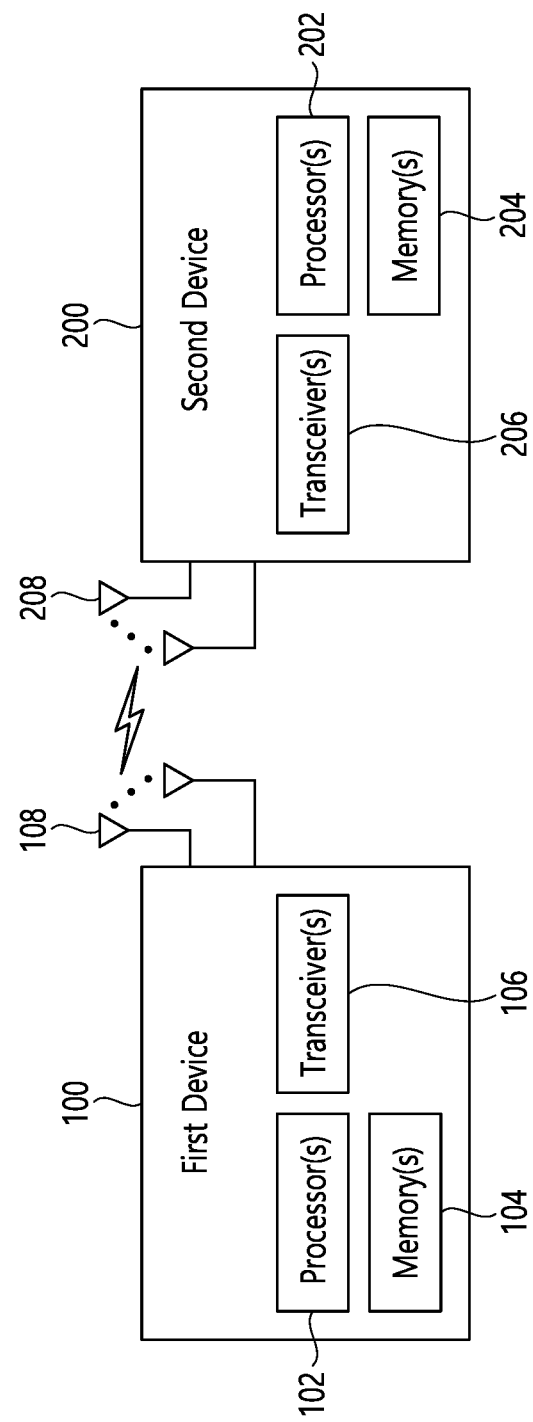
FIG. 18 shows wireless devices, based on an embodiment of the present disclosure.

FIG. 18 shows wireless devices, based on an embodiment of the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 19:
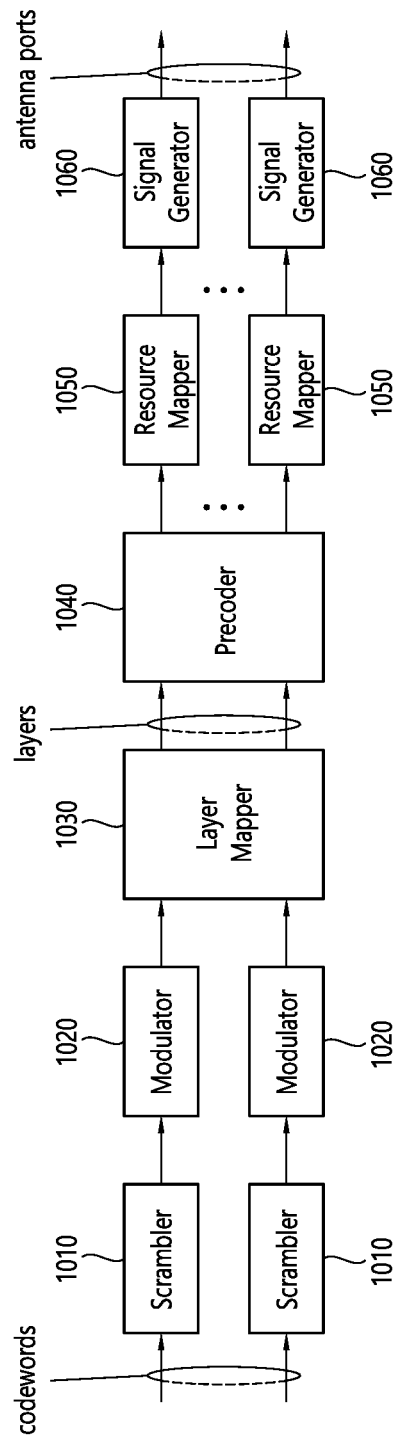
FIG. 19 shows a signal process circuit for a transmission signal, based on an embodiment of the present disclosure.

FIG. 19 shows a signal process circuit for a transmission signal, based on an embodiment of the present disclosure.

Referring to FIG. 19, a signal processing circuit 1000 may include scramblers 1010, modulators 1020, a layer mapper 1030, a precoder 1040, resource mappers 1050, and signal generators 1060. An operation/function of FIG. 19 may be performed, without being limited to, the processors 102 and 202 and/or the transceivers 106 and 206 of FIG. 18. Hardware elements of FIG. 19 may be implemented by the processors 102 and 202 and/or the transceivers 106 and 206 of FIG. 18. For example, blocks 1010 to 1060 may be implemented by the processors 102 and 202 of FIG. 18. Alternatively, the blocks 1010 to 1050 may be implemented by the processors 102 and 202 of FIG. 18 and the block 1060 may be implemented by the transceivers 106 and 206 of FIG. 18.

Codewords may be converted into radio signals via the signal processing circuit 1000 of FIG. 19. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 19. For example, the wireless devices (e.g., 100 and 200 of FIG. 18) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 20:
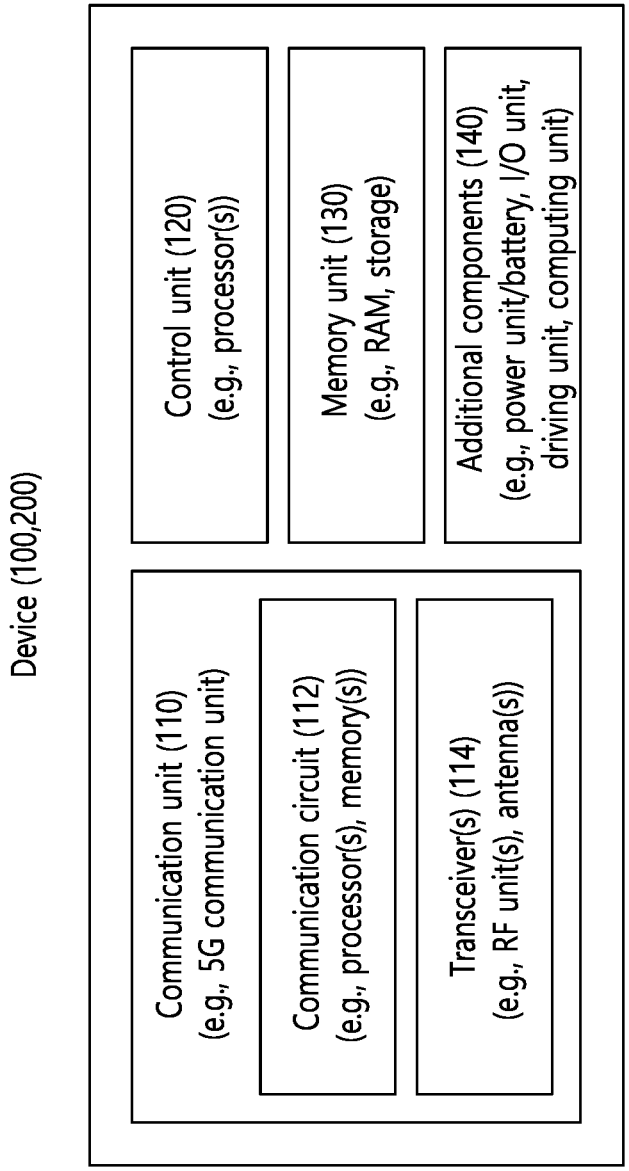
FIG. 20 shows another example of a wireless device, based on an embodiment of the present disclosure.

FIG. 20 shows another example of a wireless device, based on an embodiment of the present disclosure. The wireless device may be implemented in various forms according to a use-case/service (refer to FIG. 17).

Referring to FIG. 20, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 20 will be described in detail with reference to the drawings.

Figure 21:
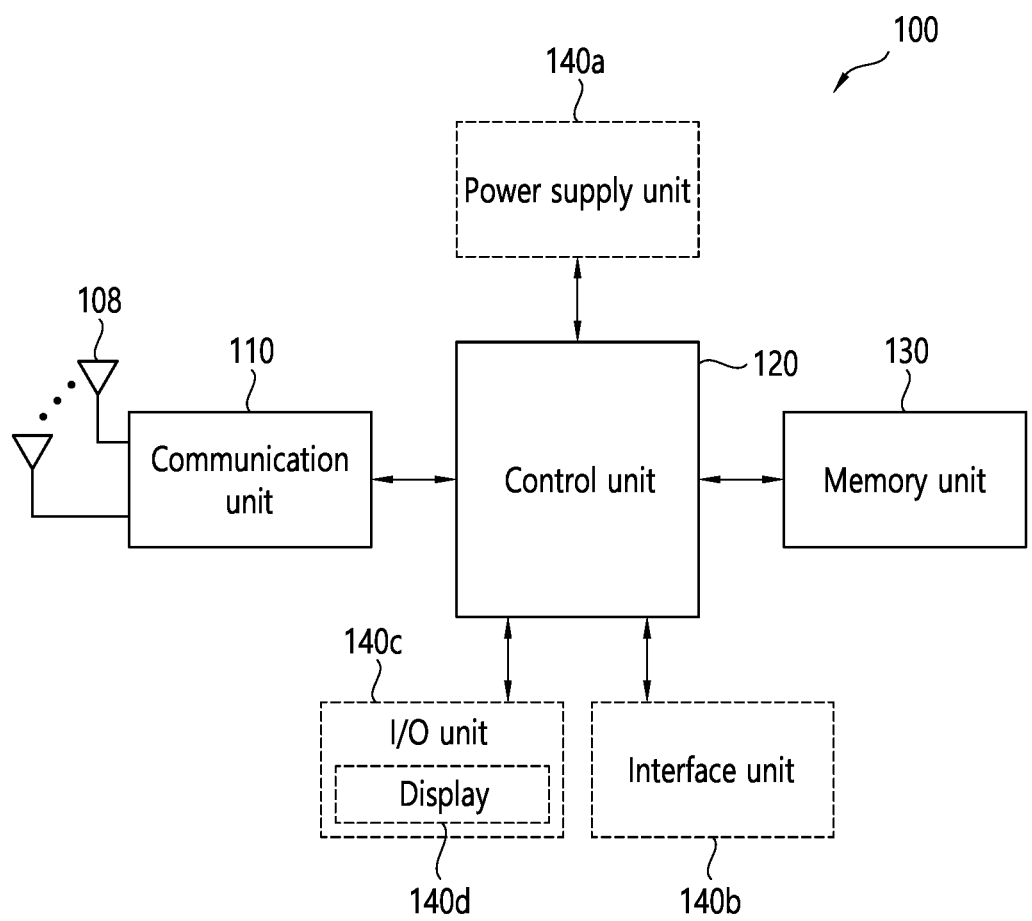
FIG. 21 shows a hand-held device, based on an embodiment of the present disclosure.

FIG. 21 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 21, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 20, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 22:
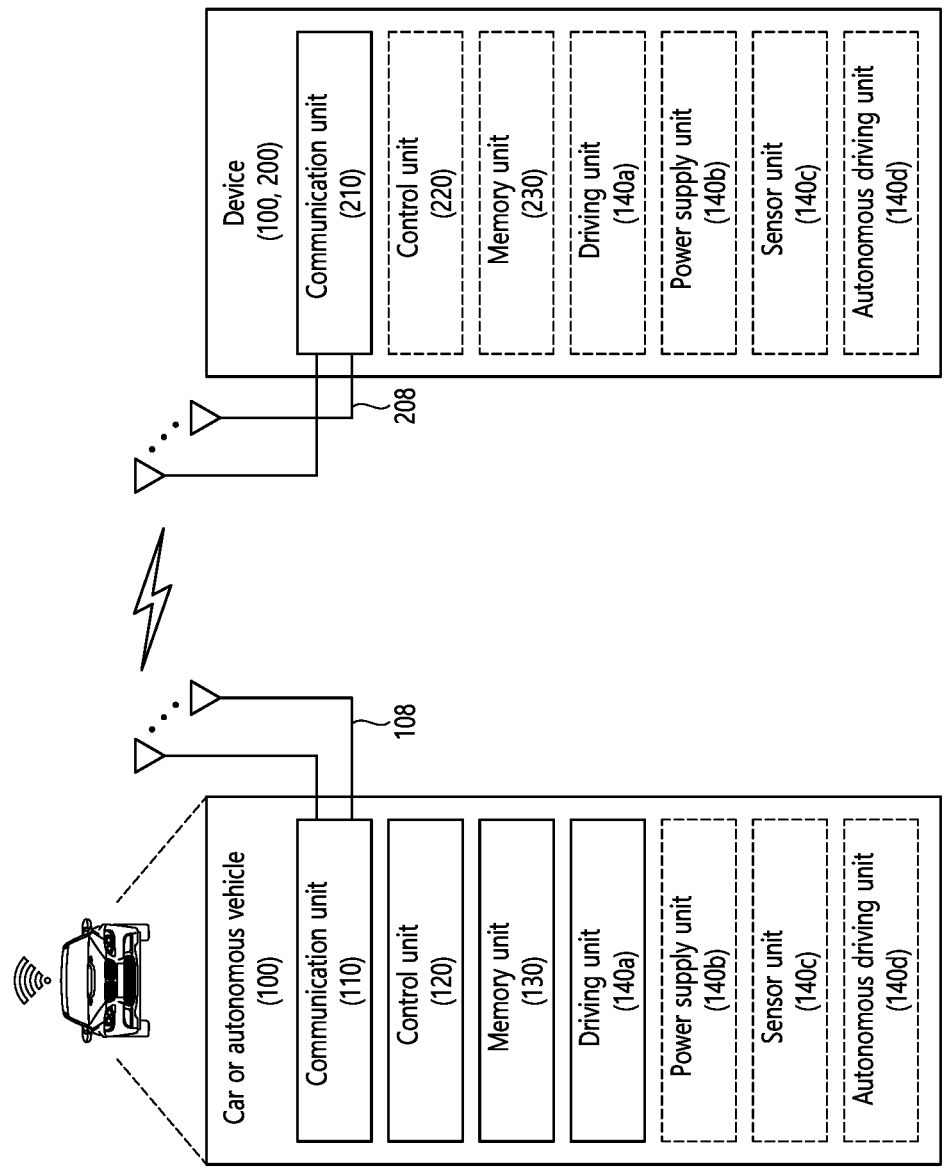
FIG. 22 shows a vehicle or an autonomous vehicle, based on an embodiment of the present disclosure.

FIG. 22 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 22, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is configured, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

The scope of the disclosure may be represented by the following claims, and it should be construed that all changes or modifications derived from the meaning and scope of the claims and their equivalents may be included in the scope of the disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first apparatus, wireless communication, the method comprising:
    determining a physical sidelink feedback channel resource for transmitting a physical sidelink feedback channel to a second apparatus;
    determining a sidelink positioning reference signal resource for transmitting a sidelink positioning reference signal for sidelink positioning,
    wherein the sidelink positioning reference signal resource is a resource that is frequency division multiplexed with the physical sidelink feedback channel resource; and
    transmitting, to the second apparatus, the sidelink positioning reference signal based on the sidelink positioning reference signal resource,
    wherein a degree of similarity between a sequence form or a sequence type of the sidelink positioning reference signal and a sequence form or a sequence type of the physical sidelink feedback channel is equal to or more than a pre-defined threshold degree.

2. The method of claim 1, wherein the sidelink positioning reference signal resource and the physical sidelink feedback channel resource are on a same slot.

3. The method of claim 1, wherein a frequency interval of the sidelink positioning reference signal resource and a frequency interval of the physical sidelink feedback channel resource do not overlap each other.

4. The method of claim 1, wherein a frequency interval of the sidelink positioning reference signal resource is reserved in advance.

5. The method of claim 1, wherein power allocation for a transmission of the sidelink positioning reference signal is prioritized between the transmission of the sidelink positioning reference signal and a transmission of the physical sidelink feedback channel.

6. The method of claim 1, wherein based on a priority information on the sidelink positioning reference signal and a priority information on the physical sidelink feedback channel, power allocation for a transmission having a relatively high priority between a transmission of the sidelink positioning reference signal and a transmission of the physical sidelink feedback channel is prioritized.

7. The method of claim 1, wherein a time interval of the sidelink positioning reference signal resource and a time interval of the physical sidelink feedback channel resource are the same as each other.

8. The method of claim 1, wherein a time interval of the sidelink positioning reference signal resource and a time interval of the physical sidelink feedback channel resource partially overlap each other.

9. A first apparatus configured to perform wireless communication, the first apparatus comprising:
   one or more memories storing instructions;
   one or more transceivers; and
   one or more processors connected to the one or more memories and the one or more transceivers, wherein the one or more processors execute the instructions to:
   determine a physical sidelink feedback channel resource for transmitting a physical sidelink feedback channel to a second apparatus;
   determine a sidelink positioning reference signal resource for transmitting a sidelink positioning reference signal for sidelink positioning,
   wherein the sidelink positioning reference signal resource is a resource that is frequency division multiplexed with the physical sidelink feedback channel resource; and
   transmit, to the second apparatus, the sidelink positioning reference signal based on the sidelink positioning reference signal resource,
   wherein a degree of similarity between a sequence form or a sequence type of the sidelink positioning reference signal and a sequence form or a sequence type of the physical sidelink feedback channel is equal to or more than a pre-defined threshold degree.

10. An apparatus configured to control a first user equipment (UE), the apparatus comprising:
   one or more processors; and
   one or more memories operably connected to the one or more processors and storing instructions, wherein the one or more processors execute the instructions to:
   determine a physical sidelink feedback channel resource for transmitting a physical sidelink feedback channel to a second UE;
   determine a sidelink positioning reference signal resource for transmitting a sidelink positioning reference signal for sidelink positioning,
   wherein the sidelink positioning reference signal resource is a resource that is frequency division multiplexed with the physical sidelink feedback channel resource; and
   transmit, to the second UE, the sidelink positioning reference signal based on the sidelink positioning reference signal resource,
   wherein a degree of similarity between a sequence form or a sequence type of the sidelink positioning reference signal and a sequence form or a sequence type of the physical sidelink feedback channel is equal to or more than a pre-defined threshold degree.

* * * * *